United States Patent
Gonzalez Aguirre et al.

(10) Patent No.: US 11,878,419 B2
(45) Date of Patent: Jan. 23, 2024

(54) AFFORDANCE-AWARE, MULTI-RESOLUTION, FREE-FORM OBJECT MANIPULATION PLANNING

(71) Applicant: Intel Corporation, Santa Clara, CA (US)

(72) Inventors: David Israel Gonzalez Aguirre, Hillsboro, OR (US); Javier Felip Leon, Hillsboro, OR (US); Javier Sebastian Turek, Beaverton, OR (US); Javier Perez-Ramirez, North Plains, OR (US); Ignacio J. Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 16/913,348

(22) Filed: Jun. 26, 2020

(65) Prior Publication Data
US 2020/0324409 A1 Oct. 15, 2020

(51) Int. Cl.
*B25J 9/16* (2006.01)
*B25J 19/02* (2006.01)

(52) U.S. Cl.
CPC ........... *B25J 9/1661* (2013.01); *B25J 9/1612* (2013.01); *B25J 19/023* (2013.01)

(58) Field of Classification Search
CPC ...... B25J 9/1661; B25J 9/1612; B25J 19/023; B25J 9/1697; B25J 9/1679; B25J 13/087; B25J 13/088; B25J 15/08; B25J 9/163; G05B 2219/39484; G06F 18/24; G06N 3/04; G06N 3/08
See application file for complete search history.

(56) References Cited

U.S. PATENT DOCUMENTS

| | | | |
|---|---|---|---|
| 2012/0197439 A1* | 8/2012 | Wang | G05D 1/0038 901/1 |
| 2016/0015473 A1* | 1/2016 | Frimer | A61B 1/00006 606/130 |
| 2020/0133305 A1* | 4/2020 | Gariepy | B60L 58/12 |
| 2023/0038578 A1* | 2/2023 | Hotson | G06V 20/64 |

OTHER PUBLICATIONS

Likhachev et al., "Anytime Dynamic A*: An Anytime, Replanning Algorithm," American Association for Artificial Intelligence, 2005, 10 pages.
"urdf-ROS Wiki," wiki.ros.org/urdf, retrieved Jul. 1, 2020, 5 pages.
"ROS," ros.org, retrieved Jul. 1, 2020, 2 pages.

(Continued)

*Primary Examiner* — Robert T Nguyen
(74) *Attorney, Agent, or Firm* — Hanley, Flight & Zimmerman, LLC

(57) ABSTRACT

Systems, apparatuses and methods may provide for controlling one or more end effectors by generating a semantic labelled image based on image data, wherein the semantic labelled image is to identify a shape of an object and a semantic label of the object, associating a first set of actions with the object, and generating a plan based on an intersection of the first set of actions and a second set of actions to satisfy a command from a user through actuation of one or more end effectors, wherein the second set of actions are to be associated with the command.

25 Claims, 16 Drawing Sheets

(56) References Cited

OTHER PUBLICATIONS

"OctoMap An Efficient Probabilistic 3D Mapping Framework Based on Octrees," octomap.github.io, retrieved Jul. 1, 2020, 3 pages.
Touretzky et al., "Gestalt Perception," 15-494 Cognitive Robicts, Carnegie Mellon, Feb. 27, 2008, 32 pages.
Bohg et al., "Data-Driven Grasp Synthesis—A Survey," Transactions on Robotics, aRxIV: 1309.2660v2, Apr. 14, 2016, 21 pages.
Przybylski et al., "Planning Grasps for Robotic Hands using a Novel Object Representation based on the Medial Axis Transform," h2t.anthropomatik.kit.edu/pdf/Przybylski2011.pdf, 2011, 8 pages.
Huebner et al., "Grasping Known Objects with Humanoid Robots: A Box-Based Approach," h2t.anthropomatik.kit.edu/pdf/Huebner2009.pdf, 2009, 6 pages.
Murray et al., "A Mathematical Introduction to Robotic Manipulation," CRC Press, 1994, 474 pages.
Rosch et al., "Basic Objects in Natural Categories," Cognitive Psychology 8, Academic Press Inc., 1976, pp. 382-439.
Morales et al., "Using experience for assessing grasp reliability," Third IEEE International Conference of Humanoid Robots, Oct. 2003, 19 pages.
Gonzalez-Aguirre et al., "Towards Shape-Based Visual Object Categorization for Humanoid Robots," h2t.anthropomatik.kit.edu/pdf/Gonzalez2011a.pdf, 2011, 7 pages.
Feix et al., "The GRASP Taxonomy of Human Grasp Types," IEEE Transactions on Human-Machine Systems, vol. 46, No. 1, Feb. 2016, pp. 66-77.
Ulku et al., "A Survey on Deep Learning-Based Architectures for Semantic Segmentation on 2D Images," arkiv:1912.10230v2, May 14, 2020, 21 pages.
Goldfeder et al. "Grasp Planning via Decomposition Trees," IEEE International Conference on Robotics and Automation, Apr. 10-14, 2007, pp. 4679-4684.
El-Khoury et al. "Handling Objects by Their Hands," IROS Workshop on Grasp and Task Learning by Imitation, 2008, 7 pages.
Fischinger et al., "Empty the Basket—A Shape Based Learning Approach for Grasping Piles of Unknown Objects," IEEE International Conference on Intelligent Robots and Systems, Oct. 7-12, 2012, 7 pages.
Kalogerakis et al., "3D Shape Segmentation with Projective Convolutional Networks," people.cs.umass.edu/~kalo/papers/shapepfcn/ShapePFCN.pdf, 2017, 11 pages.
Hillenbrand et al., "Transferring Functional Grasps through Contact Warping and Local Replanning," IEEE/RSJ International Conference on Intelligent Robots and Systems, 2012, 8 pages.
Kaiser et al., "Extracting Common Sense Knowledge from Text for Robot Planning," h2t.anthropomatik.kit.edu/pdf/Kaiser2014.pdf, 2014, 8 pages.
"schunk_svh_driver—ROS Wiki," wiki.ros.org/schunk_svh_driver, retrieved Jul. 1, 2020, 20 pages.
Porges et al., "Reachability and Dexterity: Analysis and Applications for Space Robotics," German Areospace Center, elib.dlr.de/97212/1/Astra-PUBLISHED.pdf, 2014, 7 pages.
Vahrenkamp et al., "Robot Placement based on Reachability Inversion," h2t.anthropomatik.kit.edu/pdf/Vahrenkamp2013.pdf, 2013, 6 pages.
Cambon et al., "A Robot Task Planner that Merges Symbolic and Geometric Reasoning," citeseerx.ist.psu.edu/viewdoc/download?doi=10.1.1.107.3992&rep=rep1&type=pdf, 2015, 5 pages.
Mikolov et al., "Distributed Representations of Words and Phases and their Compositionality," papers.nips.cc/paper/5021-distributed-representations-of-words-and-phrases-and-their-compositionality.pdf, 2013, 9 pages.
Pennington et al., "GloVe: Global Vectors for Word Representation," nlp.stanford.edu/pubs/glove.pdf, 2018, 12 pages.

* cited by examiner

AFFORDANCE-AWARE, MULTI-RESOLUTION, FREE-FORM OBJECT MANIPULATION PLANNING

TECHNICAL FIELD

Embodiments generally relate to end effectors. More particularly, embodiments relate to control of end effectors of robots in dynamic environments.

BACKGROUND

Robots may be able to autonomously execute tasks to complete certain goals. For example, a human may instruct a robot to execute a task, and the robot may then execute the task without supervision. As the tasks rise in complexity and environments increase in variability, the robots may have increasing difficulties in executing the tasks with reliability and dependability. Moreover, dynamic environments may provide a difficult analysis for a robot. For example, objects may move and have irregular shapes making interaction difficult.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
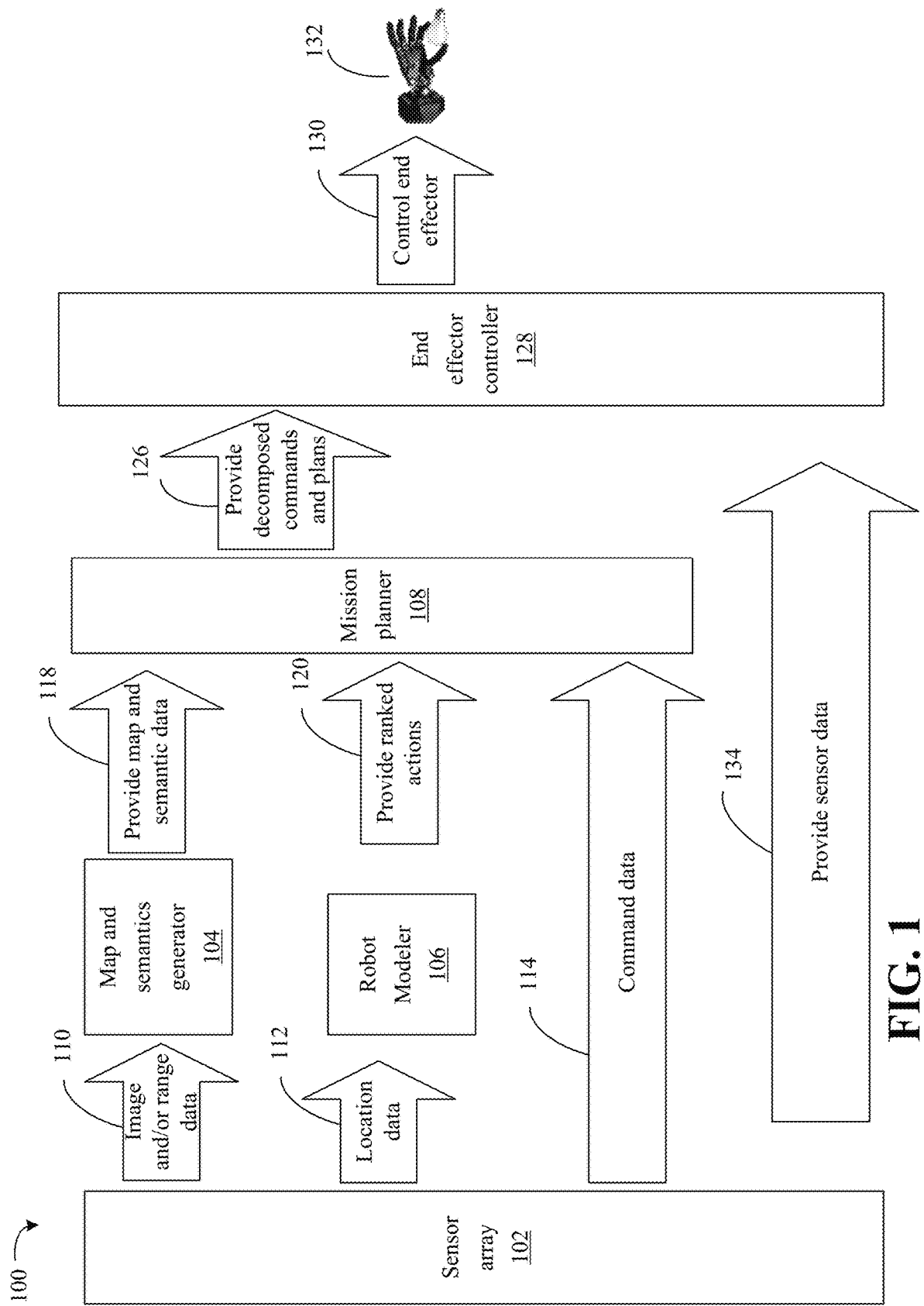
FIG. 1 is a process flow diagram of an example of an environmental analysis and robotic end effector control process according to an embodiment.

Turning now to FIG. 1, an enhanced environmental analysis and robotic end effector control process 100 is illustrated. A robot may include sensor array 102, map and semantics generator 104, robot modeler 106, mission planner 108, end effector controller 128 and robotic end effector 132 (e.g., multi-fingered robot end-effectors). The process 100 may be an integral perception-planning solution to enable the robot to grasp free-form objects in a reliable, flexible, efficient and affordance-compelling manner (e.g., based on specific characteristics of an object having a variable size, objects having different material properties, objects have different surface characteristics, etc.). Affordance-compelling may include generating robot grasps configurations with 6D poses which are coherent to the intended flow of actions and partially imitate implicit social and cultural behaviors during task execution. The robot may operate in semi-structured human-centric-spaces (e.g., household, health, retail, etc.) to accomplish tasks. For example, the robot may grasp elements that are free-forming in human-centric spaces. In detail, the mission planner 108 may efficiently, rapidly and adaptively determine suitable grasping configurations for a given robot manipulator to grasp (e.g., physically manipulate) free-form objects. The free-form objects may be previously unseen so that the robot has no previous interaction with the object (e.g., the object is "new" to the robot).

The sensor array 102 may include imaging sensors (e.g., a 2D camera, a 3D depth camera and 6D inertial measurement unit), auditory sensors, range sensors, location sensors and so forth. The sensor array 102 may provide data to the map and semantics generator 104, robot modeler 106 and mission planner 108. For example, the sensor array 102 may provide image data (e.g., a red, green, blue and depth (RGB-D) image data, 3D camera orientation, 3D point-cloud, etc.) and/or range data 110 to the map and semantics generator 104.

The map and semantics generator 104 may generate one or more maps based on the image and/or range data. For example, the map and semantics generator 104 may generate an occupancy map to represent an environment of the robot such as an occupancy map (continuous or discrete) that maps occupied spaces. In some embodiments, the map and semantics generator 104 may further map unoccupied spaces and/or unknown spaces (spaces that cannot be identified as occupied or unoccupied) and store the unoccupied spaces and/or unknown spaces in the occupied map or another map.

The map and semantics generator 104 may further generate a surface map that identifies surfaces based on the sensor data and the occupancy map (e.g., classify the occupied spaces into various surfaces). For example, the surface map may be a structured point-cloud that includes a collection of 3D vertex points linked by edges on the surfaces.

The map and semantics generator 104 may further generate a semantic labelled map (e.g., connect labels to surfaces in the surface map) based on the surface map and the sensor data. For example, the map and semantics generator 104 may include a deep neural network that identifies each object in the surface map, identifies boundaries of the object, applies a label (e.g., cup, cube, bottle, table, etc.) to the object (e.g., surface segments) and assigns a unique value (e.g., an instance identifier) to the object for future reference.

The map and semantics generator 104 may further generate a part labelled semantic map (e.g., generation of semantic endowed surface regions which may be referred to as semantic patches or surface patches) based on the semantic labelled map and the sensor data. For example, the part labelled semantic map may identify the parts of each objects. As a more detailed example, if a motorcycle is identified, the parts may include a handle, frame, seat, tank and wheel. Each of the parts may be labelled in the part labelled semantic map.

In some embodiments, the map and semantics generator 104 may omit portions of the object from further analysis if the portions are smaller than a predetermined size (e.g., smaller than a contact area of the end effector). In some embodiments, may decrease the resolution of surface patches for more efficient storage and access of corresponding identification data (e.g., corresponding image data may be stored as an octree) and further associate actions (e.g., a physical manipulation of the object) that may be taken with each identified object (e.g., move cup, refill cup, clean cup, etc.) and based on the labelled parts. Thus, the map and semantics generator 104 may link verbs (e.g., actions) and noun names in the segmented surfaces and/or parts The robot modeler 106 may receive location data 112 from the sensor array 102. In some embodiments however, the robot modeler 106 may execute the functions below without the location data 112.

The robot modeler 106 may identify a current location of the robot based on the location data 112 for example. The robot modeler 106 may generate a model of the static and dynamic geometry (e.g., kinematics) of a robot to enable planning of motions by the mission planner 108. For example, the robot modeler 106 may define robot actuators as a set of link bodies (e.g., CAD models) and joints (e.g., axes and joint range limits). The robot modeler 106 may further generate a graspability map. The graspability map may be a discretization of a workspace where the robot may apply contacts with a minimal nominal force of the robotic end effector 132. The robot modeler 106 may further penalize grasps according to a force and kinematic feasibility, and quickly reject unsuitable grasps. The robot modeler 106 may further rank actions according to feasibility and force to identify actions that have the highest probability of success and based on particular metrics (e.g., actions that have a highest probability of success given a particular object in a map and/or image and a particular available space around the object).

In some embodiments, the location data 112 may provide sensor information which is used by the robot modeler 106 in conjunction with the direct and inverse kinematics to precompute a 3d body-relative reachability map. By using that reachability map and the current state of the scene, the robot modeler 106 may identify a possible set of actions (e.g., actions to physically manipulate the object). In some embodiments the map and semantics generator 104 may provide the scene to the robot modeler 106.

In some embodiments, robot modeler 106 may receive the one or more maps of map and semantics generator 104 and determine suitable grips for various objects based on the graspability map. For example, the robot modeler 106 may identify that certain grips would be ineffective (e.g., would be unable to manipulate an object, would not be able to hold a slipper object, etc.) for the objects and thus exclude such grips from being propagated to the mission planner 108 as ranked action.

The map and semantics generator 104 may provide the map and semantic data 118 to the mission planner 108 and the robot modeler 106 may also provide the ranked actions 120 to the mission planner 108. The mission planner 108 may receive command data 114 from the sensor array 102. The command data may take the form of various sensor data such as an audio data, imaging data, etc. In some embodiments, the command data may be provided through a graphical user interface or other device. In some embodiments, the command data may be received through a distributed system (e.g., a first device sends the command to a second device directly or through the cloud).

The mission planner 108 may identify a task from a high level directive (e.g., clean the kitchen). For example, the high level directive may be decomposed into a sequence of granular atomic-actions which may be referred to as macro-plans. The macro-plans may not only provide actions (e.g., physical actions to physically manipulate the object) that may be undertaken to complete the task, but further provide operational limits corresponding to the specific domain and task.

For example, the mission planner 108 may set a maximal speed of the robotic end effector 132 along a manipulation trajectory (e.g., for social space sharing) or maintain containers with orientation limits to avoid failure of the mission (e.g., spilling liquids in a container). The case-by-case operational limits may change in each step of the plan. Thus, identifying the operation limits may filter both affordances by attribute and prioritize affordances by range matching.

In some embodiments, the mission planner 108 may receive the one or more maps of the map and semantics generator 104 and/or an identification of ranked actions from the robot modeler 106. The mission planner 108 may determine a resulting symbolic plan with attributes and active subsets of actions based on the one or more maps of the map and semantics generator 104. The active subset of actions may be a resulting intersection of actions (e.g., verbs linked by noun names in the segmented parts) from the one or more maps from the map and semantics generator 104, actions from the ranked actions from the robot modeler 106 to implement the plan and actions (e.g., granular atomic-actions) identified from the command data 114.

The mission planner 108 may provide the decomposed commands and plans 126 to the end effector controller 128 (e.g., a processor on the end effector that controls actions). Additionally, the robot modeler 106 may provide the ranked action to the end effector controller 128, and the map and semantics generator 104 may provide the map and semantic data to the end effector controller 128. The end effector controller 128 controls the robotic end effector 130, 132 to implement the decomposed commands and plans that include actions that are identified by the mission planner 108 (e.g., intersections of actions). The sensor array 102 may further provide sensor data 134 to the end effector controller 128 so the end effector controller 128 may control the end effector 130 based on updated sensor data (e.g., positional data).

Some embodiments may be dependent with respect to learned kinematic-specific grasping functions. Some embodiments may include a multiresolution foundation that allows the integration of semantic and language knowledge-cues while extracting appropriate grasping configurations based on i) spatial-context (environment occupancy and reconstructed object surfaces), ii) part-wise semantic instance segmentation and iii) kinematic description of the end-effectors. Inputs may be merged via multiple processes orchestrated for reconstruction, filtering and inference jointly driven by high-level task-specific directives.

In some embodiments, the process 100 may implement a spatial-programming paradigm delivering enhanced parallel computational capabilities through hardware accelerators such as FPGAs. For example, any of the elements, such as map and semantics generator 104, robot modeler 106, mission planner 108, sensor array 102 and end effector controller 128 may be constituted in hardware accelerators. In addition, the low-energy consumption required by such computational devices may enhance power efficiency which may be beneficial when deploying battery-powered mobile robots. Together, the enhanced any-time multiresolution analysis, language-based affordances and the advantageous use of low-power parallel devices may result in a dependable component for sensor-driven grasp planning. The above process 100 may empower autonomous service robots to perform real-world physical-interaction tasks generating and capturing value in semi-structured environments.

Figure 2:
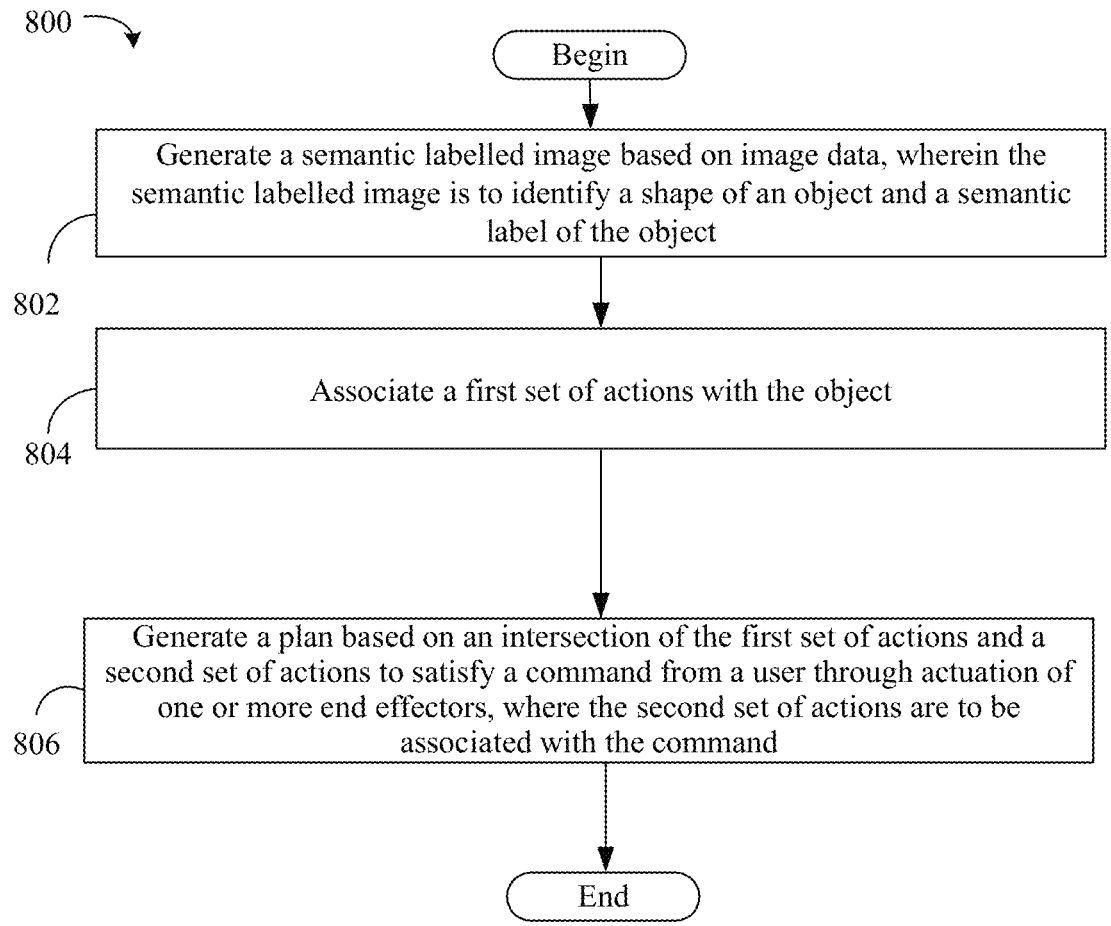
FIG. 2 is a flowchart of an example of a method of controlling an end effector according to an embodiment.

FIG. 2 shows a method 800 of controlling an end effector. The method 800 may generally be implemented in a robotic process such as, for example, the process 100 (FIG. 1), already discussed. In an embodiment, the method 800 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 800 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 802 generates a semantic labelled image based on image data, where the semantic labelled image is to identify a shape of an object and a semantic label of the object. Illustrated processing block 804 associates a first set of actions with the object. Illustrated processing block 806 generates a plan based on an intersection of the first set of actions and a second set of actions to satisfy a command from a user through actuation of one or more end effectors, where the second set of actions are to be associated with the command.

In some embodiments, the method 800 may include applying a first label to a first portion of the object, and applying a second label to a second portion of the object, wherein the second label is to be different from the first label. In some embodiments, the method 800 may further include generating a surface patch from the semantic labelled image that is to represent the object, decreasing a resolution of the surface patch, and generating the plan based on the surface patch having the decreased resolution.

In some embodiments, the method 800 may further include identifying a contact force map that represents contact force outputs mapped to portions of the one or more end effectors, and generating the plan based on the contact force map. In some embodiments, the method 800 may further include generating an occupancy map based on the image data, wherein the occupancy map is to identify portions of the image that are to be occupied, and generating a surface map based on the occupancy map that is to identify surfaces of objects. In some embodiments, the method 800 may further include connecting the surfaces in the surface map to labels to generate the semantic labelled image.

The method 800 may enable a robot to grasp free-form objects in a reliable, flexible, efficient and affordance-compelling manner (e.g., based on specific characteristics of an object having a variable size) so that the robot may operate in dynamic and quickly changing environments. The method 800 may enable robots to operate in semi-structured human-centric-spaces (e.g., household, health, retail, etc.) to accomplish tasks. In detail, the method 800 may efficiently, rapidly and adaptively determine suitable grasping configurations for a given robot manipulator to grasp free-form objects. The free-form objects may be previously unseen so that the robot has no previous interaction with the object (e.g., the object is "new" to the robot).

Figure 3A:
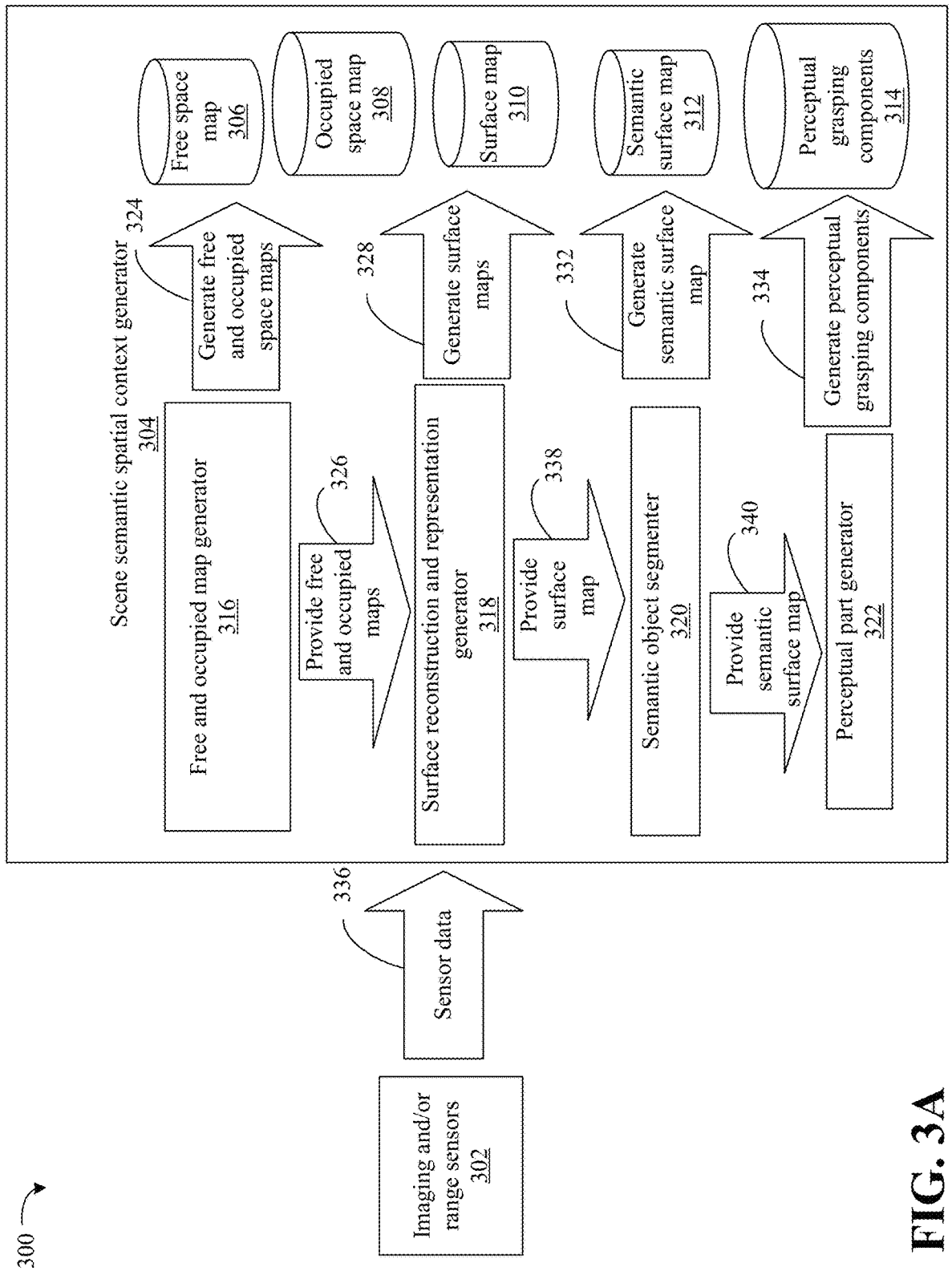
FIGS. 3A and 3B is a process flow diagram of an example of a scene segmentation process according to an embodiment.
Figure 3B:
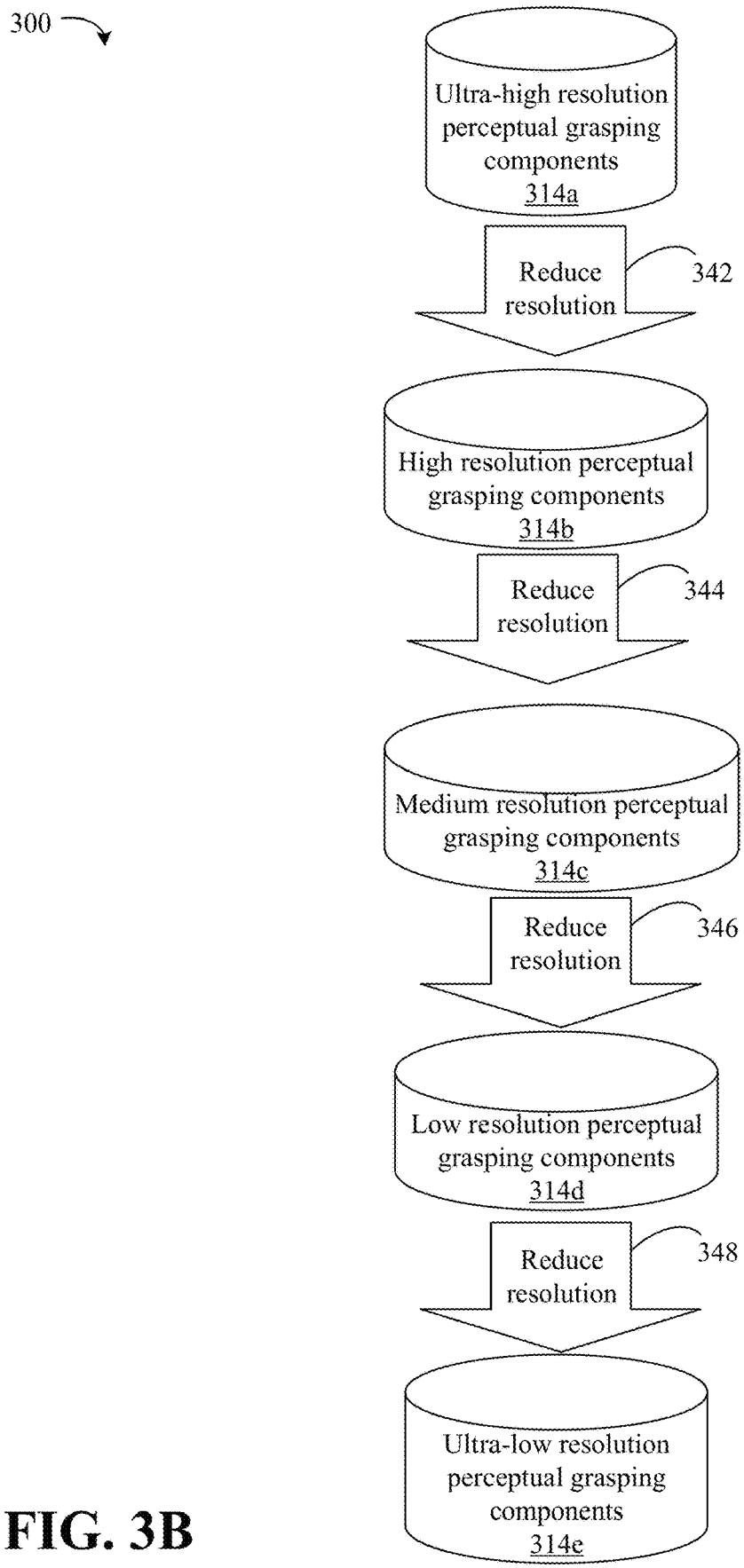

FIGS. 3A and 3B illustrates a scene segmentation process 300. The process 300 may include a scene semantic spatial context generator 304. The scene semantic spatial context generator 304 may be readily substituted for the map and semantics generator 104 of FIG. 1.

Imaging and/or range sensors 302 may provide sensor data 336 to the scene semantic spatial context generator 304. The sensor data may include imaging data (e.g., RGB-D data) and/or range data. Imaging sensors of the imaging and/or range sensors 302 may be devices contained within a composed sensor (e.g., RGB-D camera or camera module). For example, the imaging and/or range sensors 302 may provide three data streams capturing information regarding a content in a field-of view and the time-varying 6D pose of one or more objects.

For example, the field of view may be captured in terms of structure through a discrete depth image or another image from which depth may be derived (e.g., 3D projection via intrinsic sensor calibration) in the form of a structured point-cloud. The image may be infrared enhanced (e.g., associated infrared, reflectance intensity or absorption values) graph-like set of 3D points (e.g., a noise-prone front-wave composition of the scene's surfaces).

The imaging and/or range sensors 302 may also provide a digital RGB-color image of the scene with a high resolution. This passive camera captures the chromatic appearance of the objects with fine detail. Such images may lack explicit depth information. Thus, based on extrinsic calibration between the depth and color cameras, the scene semantic spatial context generator 304 may map 3D points from the structured point-cloud to the RGB image plane in order to associate color values per point. Some embodiments may also associate depth to most of the pixels of the digital image. In some embodiments, imaging and/or range sensors 302 may include LIDARs or other 3D range sensors.

The imaging and/or range sensors 302 may also include a built-in multiple-axis inertial measurement unit (IMU), which may provide IMU measurements in the sensor data 336. Thus, the scene semantic spatial context generator 304 may obtain a fused state assertion from measured acceleration, linear and angular velocities of the imaging and/or range sensors 302 (e.g., a camera module).

Therefore, the scene semantic spatial context generator 304 may generate a 6D kinematic frame based on the fused assertion. The 6D kinematic frame may be 6D because of 3 degrees of freedom for position and 3 degrees of freedom for orientation. The set of 6 degrees of freedom may unambiguously define a pose in space. In some embodiments, the motion may further be defined with respect to speed in each dimension namely $V_x$, $V_y$, $V_z$ as well as $V_{roll}$, $V_{pitch}$ and $V_{Yaw}$, which will may correspond to another set of 6 degrees of freedom. The degrees of freedom of the robotic end effector 132 may not be limited by 6 degrees of freedom, but may depend on a robot structure associated with the robotic end effector 132, motors and joint types. In some embodiments, a robot may need to have at least 6 degrees of freedom to grasp objects in a general position The 6D kinematic frame may include the added features such as gravitational orientation. In doing so, it may be possible to discern the relative direction of the ground-floor based on the constant gravitational acceleration, and may be used to provide context to surfaces and object dynamics. This collection of signals may be exteroceptive sensor input which is processed by geometric, semantic and fusion processes as follows as described below.

The scene semantic spatial context generator 304 may include a free and occupied map generator 316 that generates free and occupied space maps 306, 308, 324. The free and occupied map generator 316 may generate spatial maps and surface reconstructions on the spatial maps.

The free and occupied map generator 316 may generate sparse dual-space map that may capture and split the occupied and unfilled (free) spaces. This mapping may allow for: i) registering diverse 3D images while exploring various interaction (e.g., grasping) scenarios for a kinematic end effector, ii) determine possible collision-free manipulator 6D poses in the environment and iii) serve as an effective scaffolding data structure to store multiresolution local surface descriptors such as volumetric (e.g., with respect to voxels) semantic labels and other attributes.

The sparse dual-space maps be high-resolution octrees of the workspace that may further allow for explicit separation of graspable spaces from non-graspable spaces, and in particular categorize spaces into three categories: 1) unseen spaces, 2) occupied spaces and 3) free spaces. The octree may be considered fully observed (e.g., consequently outer-voxels can be labeled as occupied) or empty spaces (e.g., larger inner-voxels labeled as empty) respectively. An initial map, which may be generated based on the sensor data, may be formally expressed as a continuous occupancy mapping function F with logarithmic evaluation complexity as $$\Gamma(x \in \mathbb{R}^3) \to \{1,0\}. \qquad \text{Equation 1}$$

Moreover, for each point $x_i \in \mathbb{R}^3$ the free and occupied map generator 316 may determine a corresponding voxel $\Theta_i$ container of the point and an implicit graph-path containing the subspace and/or subgraph via a discretization function. The discretization function may be a voxelization process that may be executed while generating an octree. The voxelization process may include sequential insertion into a spatial partitioning data structure. The result may be a regular tree with a valence (e.g., degree 8) that corresponds to the subdivision of space octants in 3D space. For example, the following equation 2 may express β which may be an octree:

$$\beta(x \in \mathbb{R}^3) \to [\Theta_i, \Theta_{i-1}, \Theta_{i-2}, \ldots, \Theta_0] \qquad \text{Equation 2}$$

In Equation 2, the root voxel at $\Theta_0$ may represent an entire captured scene subspace. Both the outer and inner nodes of the octree may contain diverse attributes depending on the implementation. The attributes may be expressed by "access functions" as indicated below in Equation 3:

$$\lambda(x \in \mathbb{R}^3) \to \Omega. \qquad \text{Equation 3}$$

Equation 3 may be a value-property mapping over a tailored attribute set $\Omega$. The attribute set and/or Equation 3 may be utilized during fusion and scaffolding roles of the free and occupied space maps 306, 308.

The free and occupied map generator 316 may extract a single-category version of the initial map to generate free and occupied space maps 306, 308. The occupied space map 308 may be the set of points fulfilling the constraint $\Gamma(x)=1$ as $$M_P := \{x \in \mathbb{R}^3 | \Gamma(x)=1\} \qquad \text{Equation 4}$$

Thus, based on Equation 4, the union of occupied voxels may lead to the occupied space map 308 which may be determined based on the following equation 5:

$$M_v := \left\{ \bigcup_i \beta(x_i), \forall x_i | \Gamma(x_i) = 1 \right\} \qquad \text{Equation 5}$$

Further, the free and occupied map generator 316 may invert the occupied space map 308 or modify one or more of equations 1-5 (e.g., modify occupied $\Gamma(x_i)=1$ to empty $\Gamma(x_i)=0$) to generate the free space map 306. For example, Equations 3 and/or Equation 5 may be modified in order to define a point-wise empty space map $N_p$ or a discrete version in an empty voxel map by Equation 4 producing an $N_v$ map that is stored as the free space map 306. Thus, the free space map 306 may be an inverted octree scene relative to the occupied space map 308.

The free and occupied map generator 316 may provide the free and occupied maps 306, 308, 326 to the surface reconstruction and representation generator 318. In some embodiments, only the occupied space map 308 is provided to the surface reconstruction and representation generator 318, and/or may be filtered based on criteria. The surface reconstruction and representation generator 318 may further identify image data (e.g., RGB data) from the sensor data 336.

A structured point-cloud (which may be the same as the point-cloud described above, and may be based on a 2D RGB image) may include of a collection of 3D vertex points. The 3D vertex points may be provided by:

$$P := \{x_i \in \mathbb{R}^3\} \qquad \text{Equation 6}$$

The vertex points may be linked by edges in an 8-connectivy pixel-like function defined by the following:

$$L(x_i, x_j) \mapsto \{1,0\} \qquad \text{Equation 7}$$

In enhancement to generating a graph structure on the point-cloud may be the ability to extract an implicit set of simplexes defining surface primitives (e.g., 3D triangles).

In some embodiments, due to sensing-limitations, depth images might omit values which may produce undesirable surface holes on the graph structure (e.g., graph structure has a hole over a surface of an object rather than a vertex). Some embodiments may further include additional metrics when extracting the underlying primitives. For example, an edge $E_{i,j}$ may exist if Equation 7 above meets $L(x_i, x_j)=1$ with a length $|E_{i,j}| \mapsto \mathbb{R}^+ < d_m$ which is upper limited as a function of the depth from the camera to the vertices $d_m \sim \varepsilon \cdot \max(x_i, x_j)$. This connectivity criteria may be illustrated in various ways, such as valid edges with a first characteristic (e.g., yellow colored) or invalid edges with a second characteristic (e.g., red) in the structured point-cloud. For each vertex in P incident to at least one primitive $T_{i,j,k}$, the surface reconstruction and representation generator 318 may determine the associated normal vector according to the following:

$$N(x_i) \mapsto \{n_i \in \mathbb{R}^3, |n_i|=1\} \quad \text{Equation 8}$$

Equation 8 may be based on the normalized aggregation of connected triangle normals. Equation 8 may be a way to obtain a normal vector for each point over the surface. Doing so may aid in planning the contact points and margin distances along the approximation of the robotic end effector 132. For example, equation 8 may express that the T{i,j,k} references a triangle passing through surface points i, j and k, thus for any point it is possible to determine the normal by averaging the Normals of the incident triangles.

In some embodiments, a surface map 310, which is represented by $\phi$ in the equation below, of the scene is the union of all primitives in the scene:

$$\phi:=\{U_{i,j,k} T_{i,j,k} | i,j,k \in P \wedge i \neq j, i \neq j, k \neq k / \wedge L(x_i,x_i)=L(x_j,x_k)=L(x_k,x_i)=1\}. \quad \text{Equation 9}$$

Further, a connected subset of triangles may define a surface component $\omega_r \subset \phi$ whose extraction simultaneously links each triangle to its containing voxel within the occupied discrete map $M_v$ from Equation 5. A subjective triangle-to-voxel attribute function may also allow for subsequent fusion and semantics transfer processes. The triangle-to-voxel attribute function may be provided below:

$$\lambda(T_{i,j,k} \in \phi) \rightarrow \beta(x_i) \cup \beta(x_j) \cup \beta(x_k) \quad \text{Equation 10}$$

Additionally, the surface map 310 may include attributes from the subjective triangle-to-voxel attribute functions. The surface reconstruction and representation generator 318 may thus generate the surface map 310, 328 and store the surface map 310.

The surface reconstruction and representation generator 318 may provide the surface map 310, 338 to the semantic object segmenter 320. The semantic object segmenter 320 may identify objects, segment the objects and label the objects as explained below.

The semantic object segmenter 320 may identify an RGB-image $I(\alpha \in \mathbb{N}^2) \mapsto \mathbb{N}^3$ and from the sensor data 336. The semantic object segmenter 320 may exploit a pixel-wise semantic instance segmentation via depth neural networks DNN (e.g., expressed as single function $\kappa$), to generate an instance-identified semantic labelled image $\Psi(\alpha \in \mathbb{N}^2) \mapsto \Sigma$.

In the semantic labelled image, each pixel may contain: i) the probability distribution over the set $\mathbb{Q}$ with $|\mathbb{Q}|=n$ predefined prototypical classes and ii) the corresponding instance identifier (denoted as "id" that may be a non-zero unique integer) where the network distinctively associated pixels-to-instances. For example, a dataset of labels of the semantically labelled image may include the following labelled dataset $\Sigma:=[\text{cup},\varepsilon_0,h_1]$, $[\text{bottle},\varepsilon_1, h_j]$, $[\text{plate},\varepsilon_2,h_k]$, $[\text{table},\varepsilon_3,h_l]$, ... $\}$. In some embodiments, a special "unknown" class for all unclassified pixels as [unknown, $\varepsilon_n$, 0] may also be included. The dataset may further subject to the following equation:

$$\Sigma_i^n \varepsilon_i = 1 \text{ and } 0 \leq \varepsilon_i \leq 1 \quad \text{Equation 11}$$

In the dataset, $h_i$ represents numeric identifiers associating each pixel to an object instance or "0" for those in the unknown class. The overall extraction process over all pixel locations a may be provided by equation 12:

$$\kappa(I(\alpha \in \mathbb{N}^2)) \mapsto \Sigma\alpha:=[\text{cup},\varepsilon 0,hi],[\text{bottle},\varepsilon 1,hj],[\text{plate},\varepsilon 2,hk],[\text{table},\varepsilon 3,hl], \ldots \} \quad \text{Equation 12}$$

The semantic object segmenter 320 may also integrate the derived semantic information, labels, confidence and instance ids through a consensus in the 3D occupancy while connecting labels to surface segments as follows. For example, while simultaneously exploiting the mutual extrinsic calibrations between imaging and/or range sensors 302 (e.g., the depth camera and the color camera) the semantic object segmenter 320 may project spatial points into a camera image plane (e.g., RGB camera plane). Based on this mapping, the 2D semantic labels may transferred to each vertex point of the surface. The semantic surface map with the labels transferred to each vertex point may be stored as semantic surface map 332.

In some embodiments, the DNN may generate the results described in equation 12. In order to mitigate errors or discrepancies at borders of the objects represented in the images, each point may be a connected to surface component, as determined from Equation 9, and provided below:

$$\omega_r \subset \phi \quad \text{Equation 13}$$

A split-and-merge process may conducted via conditioned region growing using the object ids (e.g., $h_i$ in Equation 12) only for high confidence classification probabilities $\varepsilon_i$. In doing so, the 3D surface connected-components may be transformed (e.g., one or more of erodes and splits) into semantic labelled surface regions or semantic patches for short $\omega_r^s \in \omega_r$.

In some embodiments, extracted semantic patches (e.g., a surface labelled as a one semantic label such as back of a chair, armrest of a chair, seat of a chair, leg of a chair, etc.) of an object that each have a size smaller than a contact surface of a robot manipulator may be excluded from further consideration or interaction with the robot manipulator. Further, such excluded semantic patches may be excluded from subsequent phases without concerns about collisions during motion due to the up-to-date occupancy maps. At this point, the surface segments $\omega_r^s$ may describe the content of the semantic surface map 312.

The semantic object segmenter 320 may further conduct a part classification on each semantic patch associated to an object instance. For example, the semantic object segmenter 320 may conduct a part classification r refinement process, where $q_O$ describes the set of possible part names induced over the object category. The part classification may stored in the semantic surface map 312. The semantic object segmenter 320 may provide the semantic surface map 312, 340 to a perceptual part generator 322 that generates perceptual grasping components 314, 334.

The perceptual part generator 322 may further identify 2D RGB image data from the sensor data 336. The perceptual part generator 322 may generate perceptual grasping components ("PGC"). Each PGC may be composed as 4-tuples with i) a semantic surface patch $\omega_r^s$, ii) the class of object to which the patch belongs $q \in \mathbb{Q}$, iii) the part-name associated with the patch $r \in q_\mathbb{Q}$ and iv) a set of verbs that may be defined by the following equation:

$$F_{Perception}(r):=\{(fi \in A, 0 < \sigma i \leq 1 \in \mathbb{R})\} \quad \text{Equation 14}$$

The associated likelihood $\sigma_1$ describing the possible actions applied to such object-part may be provided by the following equation:

$$\tau:=[\omega_r^s, q \in \mathbb{Q}, r \in q \mathbb{Q}, F(r)] \quad \text{Equation 15}$$

The associative set of actions "A" may be extracted from the object-to-action co-occurrences from a frequency analysis of a large text corpus describing application procedures structurally organized by domain ontologies. Equation 15 may define the 4-tuples of the PGC.

Moreover, these PGC may be transformed in terms of geometric resolutions (e.g., decimated so that the boundaries of the objects have less resolution). For example and turning to FIG. 3B, for each tuple τ of Equation 15, the surface patch $\omega_r^s$ may subsampled (e.g., decimated by half sequentially) to lower the resolution of the corresponding image. In some embodiments, the decimation may occur at least five times so that the corresponding resolution is lowered by at least five levels 0≤L≤4 in such a way that the remaining signal content is 2^(−L) at each level where L refers to the level of detail. In doing so, a signal-to geometry occupancy alignment in the octree map ($M_v$ from Equation 5) may be maintained. The following equation may represent various degraded tuples that may be stored in the PGCs 314:

$$\tau_L = [\, \ell(\omega_r^s, L, M_v), q \in \mathbb{Q}, r \in q\mathbb{Q}, F(r)] \qquad \text{Equation 16}$$

The function l may be a dual-purpose operation of L-subsampling and surface registration in the occupancy map attribute $M_v$.

For example, an original ultra-high PGC 314a may be reduced. The process 300 may reduce the resolution 342 of the ultra-high PGC 314a to generate high resolution PGC 314b. The process 300 may also reduce the resolution 344 of the high resolution PGC 314b to generate medium resolution PGC 314c. The process 300 may also reduce the resolution 346 of the medium resolution PGC 314c to generate low resolution PGC 314d. The process 300 may also reduce the resolution 348 of the low resolution PGC 314d to generate ultra-low resolution PGC 314e. The PGC 314e may be stored as the PGC 314.

The PGCs 314 may be accessed by a mission planner, such as mission planner 108 of FIG. 1, to generate plans for end effector control to manipulate objects. In some embodiments, the low resolution PGC 314e may be accessed by the mission planner to generate the plans.

Figure 4:
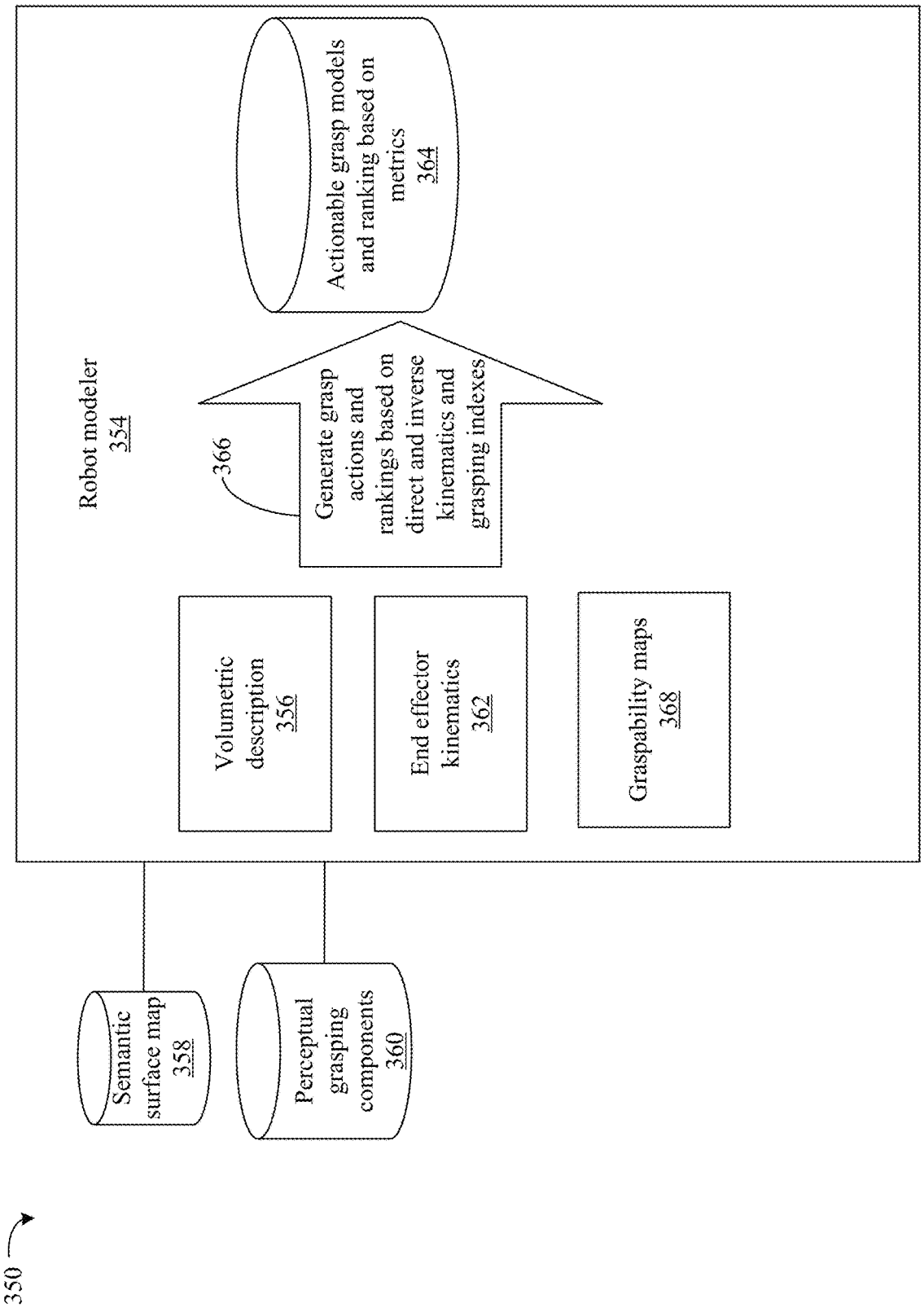
FIG. 4 is a process flow diagram of an example of modelling a kinematic end effector according to an embodiment.

FIG. 4 illustrates a process 350 to model a kinematic end effector. For example, robot modeler 354 may be connected to semantic surface map 358 and a PGC 360 as described herein. The robot modeler 354 may include a volumetric description 356 and end effector kinematics 362. The robot modeler 354 may be readily substituted for the robot modeler 106 for FIG. 1.

The volumetric description 356 and end effector kinematics 362 may be at least partially programmed ahead of time. The end effector kinematics 362 may represent robot actuators as a set of link bodies and joints (e.g., axes and joint range limits, torque capability maps, link and joint trees and axis limits). Such end effector kinematics 362 may facilitate planning for motions while avoiding undesired collisions. The end effector kinematics 362 may represent the direct and inverse kinematic of the actuator as mappings expressed by the following:

$$\xi(\theta \in \mathbb{R}^n) \mapsto \{T \in \mathbb{R}^6 \cup \backslash 0\} \qquad \text{Equation 17}$$
$$\xi^{-1}(T \in \mathbb{R}^6) \mapsto \{\theta \in \mathbb{R}^n \cup \backslash 0\},$$

In equation 17, for n motorized degrees of freedom to rigid frames may be represented by T∈ $\mathbb{R}^6 \subset SE^3$. This notation may consider the non-bijective nature of the transformation by adding a no-solution configuration "\0" in the equation 17 on both domain and co-domain.

The volumetric descriptions 356 may include volumes of segments of the kinematic end effector. Different segments may include different volumes.

The robot modeler 354 may generate graspability maps 368. The graspability maps 368 may be a discretization of a workspace where the kinematic end effector may apply contacts with a minimal nominal force. The grapsability maps 368 may be attribute-container voxel maps based on the semantic surface map 358 and/or the PGC 360. For example, the grapsability maps 368 comprehends not only occupancy values but also the strength of forces and range of orientation reachable at that position. For example, each of the grapsability maps 368 may be a color map that reflects a cross section that encodes the dexterity of each voxel (e.g., blue stand for maximal graspability). This discrete function or grasping index may expressed by the following equation:

$$\lambda_{graspability}(x \in \mathbb{R}3) \rightarrow [0,1] \in \mathbb{R} \qquad \text{Equation 18}$$

The robot modeler 354 may penalize grasps according to volumetric feasibility, force feasibility and kinematic feasibility. For example, grasps that exceed a contact force, and as identified from the graspability maps 368, may be rejected to avoid damaging objects.

The robot modeler 354 may therefore efficiently and quickly reject unsuitable grasps while simultaneously providing a mathematical analysis to drive gradient estimations for best grips during, for example, neural network training. The robot modeler 354 may further select grasps from the graspability map 368 and generate grasp actions and rankings based on direct and inverse kinematics and grasping indexes 366. Thus, the robot modeler 354 may generate actionable grasp models, and rank the models based on metrics 364.

Figure 5:
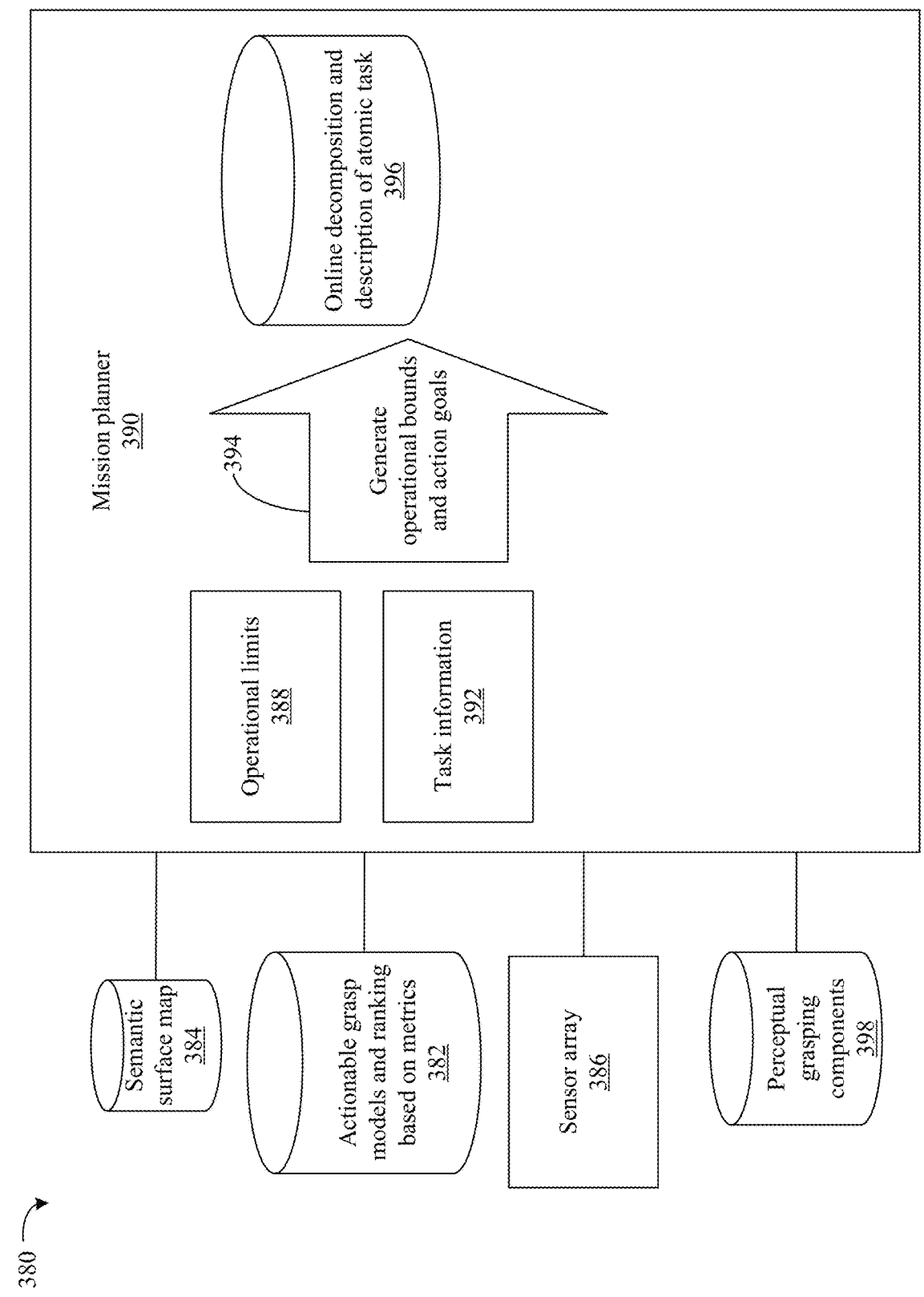
FIG. 5 is a process flow diagram of an example of planning a mission according to an embodiment.

FIG. 5 illustrates a process 380 to plan a mission. The process 380 may include a mission planner 390. The mission planner 390 may be readily substituted for the mission planner 108 of FIG. 1. The mission planner 390 may be connected to a semantic surface map 384, actional grasp models and ranking based on metrics 382, sensor array 386 and PGC 398.

The mission planner 390 may capture and unfold high-level directives from sensor data provided by the sensor array 386 (e.g., "clean the kitchen"). The mission planner 390 may decompose the directive into a fine granular sequence of physical atomic-actions or tasks (e.g., primary task, secondary task, target object part assertion, affordance list, etc.) to accomplish the high level directive. The tasks may be stored in the task information 392.

Furthermore, actions may be considered macro-plans that provide operational limits corresponding to the specific domain and task and action goals 394. The mission planner 390 may set a maximal speed of an end-effector along a manipulation trajectory (for social space sharing) or keeping containers with orientation limits (e.g., smoothness or responsiveness) to avoid spilling liquids. The case-by-case operational limits may change in each step of the plan, and may be stored in the operation limits 388. Thus, providing this information in the grasp planning may enable filtering both affordances by attribute and prioritizing affordances by range matching.

The resulting symbolic plan with attributes and an active subsets of actions may be stored as part of the online composition and description of the atomic task 396. The active subset of actions may be the resulting intersection of actions (verbs linked by noun names in the segmented parts or patches) that may be derived from the PGC 398, and verbs from the decomposition of the high-level directive while creating atomic tasks.

Further, a language-based formal representation of a contextualized atomic task may be action tuples composed by five elements: i) a place-label $\iota_c$ describing general context or location where the action is happening such as "Kitchen", "Living-room", etc. ii) an object-label $\iota_o$ describing the target object, for instances "Mug", "Pillow", etc. iii) a part-label $\iota_p$ depicting a region induced from the target object, namely "Handle", "Arm", "Rest", iv) a verb-segment-label $\iota_s$ describing the segment action which may contain one or more atomic actions, for example "Arrange", "Sort", "Dispose", etc. and finally v) an atomic-verb-label $\iota_a$ denoting indivisible operation such as "Pick", "Slide", "Push", "Pull", etc. For learning and inference purposes, these labels are embedded into vector $\Pi(\iota \in \text{String}) \mapsto \mathbb{R}^g$ representations which enable a mathematical vector operation rendering semantic properties such as implicit analogies by vector subtraction or additions. The following equation may express the above:

$$\gamma := [\Pi(\iota_c), \Pi(\iota_o), \Pi(\iota_p), \Pi(\iota_s), \Pi(\iota_a)] \in \mathbb{R}^{5g} \qquad \text{Equation 19}$$

The dimensionality (e.g., $5g$) may depend on a specific embedding (e.g., bag of words or skip grammars), or a more compact one when using recent stand-alone unsupervised methods which require no text-window.

Figure 6:
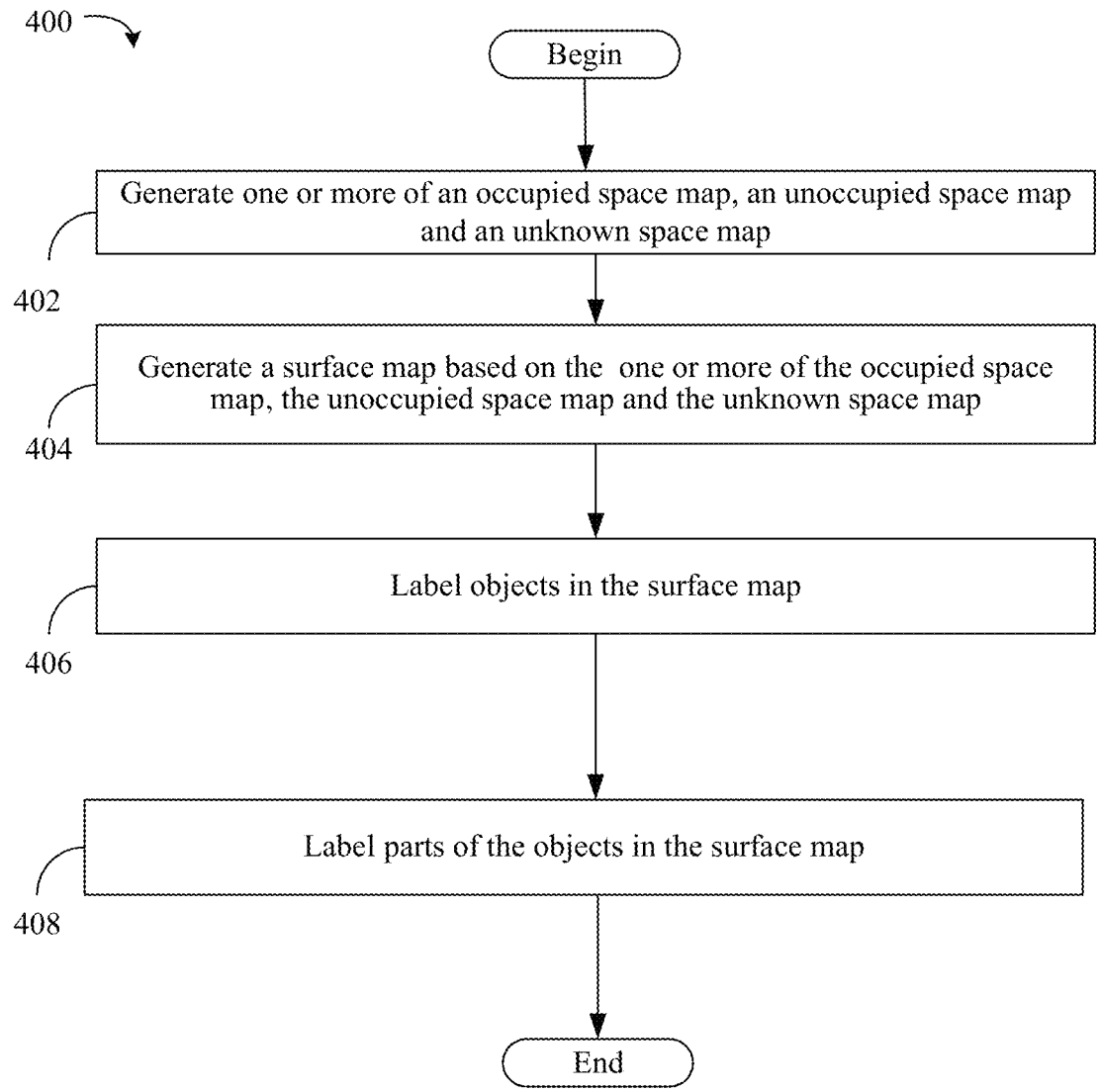
FIG. 6 is a flowchart of an example of a method of analyzing and representing an environment according to an embodiment.

FIG. 6 shows a method 400 of analyzing and representing an environment. The method 400 may generally be implemented in a robotic process such as, for example, the process 100 (FIG. 1) and/or the process 300 (FIGS. 3A and 3B) already discussed. The method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 402 may generate one or more of an occupied space map, an unoccupied space map and an unknown space map. Illustrated processing block 404 generates a surface map based on the one or more of the occupied space maps, the unoccupied space map and the unknown space map. Illustrated processing block 406 labels objects in the surface map. Illustrated processing block 408 label parts of the objects in the surface map. Method 400 may further include conducting a PGC process on the surface map.

Figure 7:
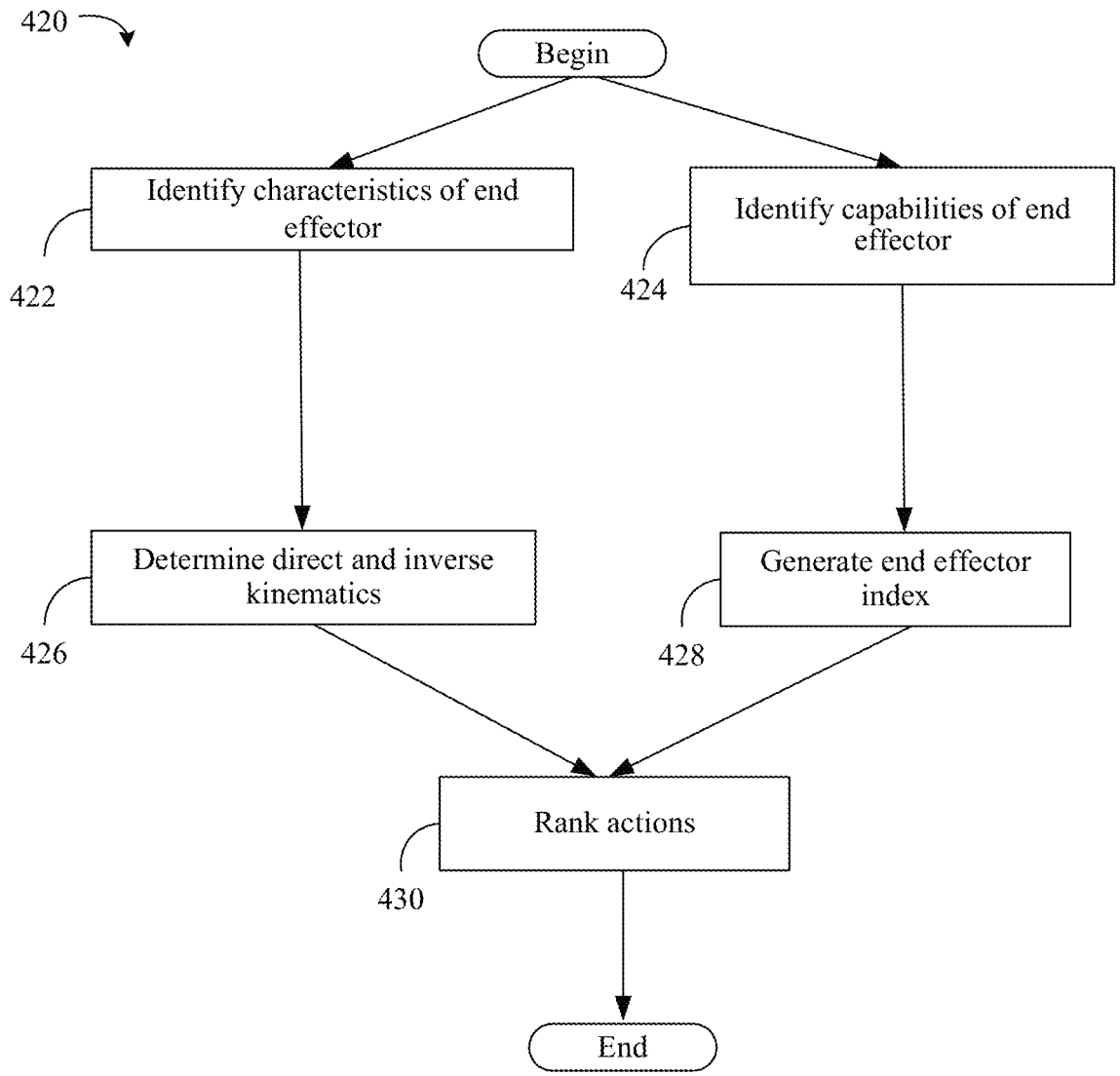
FIG. 7 is a flowchart of an example of a method of classifying an end effector according to an embodiment.

FIG. 7 shows a method 420 of classifying an end effector. The method 420 may generally be implemented in a robotic process such as, for example, the process 100 (FIG. 1) and/or the process 350 (FIG. 4) already discussed. The method 420 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 422 identifies characteristics of an end effector. Illustrated processing block 424 identifies capabilities of the end effector. Illustrated processing block 426 determines direct and inverse kinematics associated with the end effector. Illustrated processing block 428 generates end effector indexes (e.g., graspability maps). Illustrated processing block 430 ranks the actions.

Figure 8:
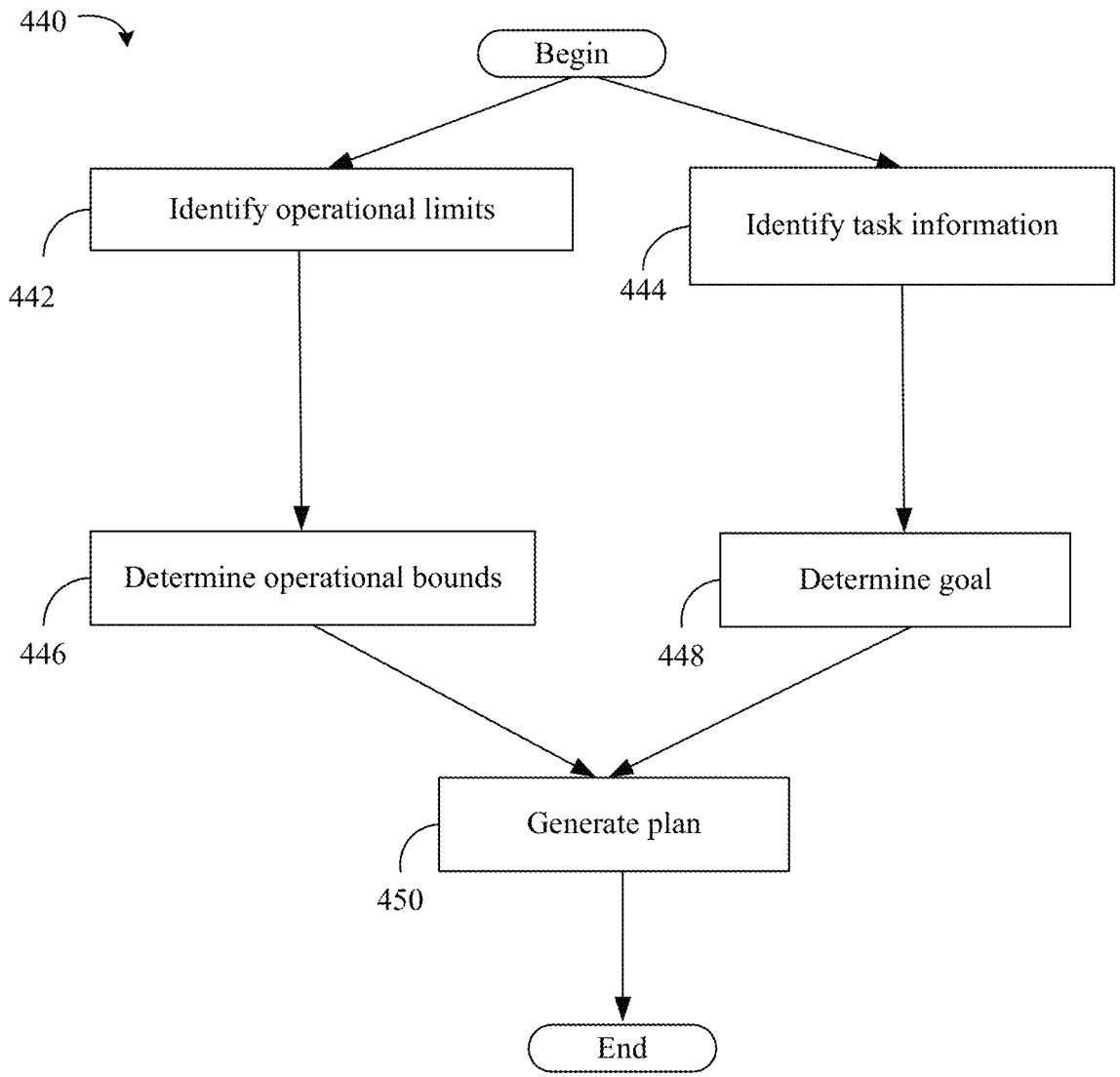
FIG. 8 is a flowchart of an example of a method of mission planning according to an embodiment.

FIG. 8 shows a method 440 of mission planning. The method 440 may generally be implemented in a robotic process such as, for example, the process 100 (FIG. 1) and/or the process 380 (FIG. 5) already discussed. The method 440 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 442 identifies operational limits of a mission. Illustrated processing block 444 identifies task information. Illustrated processing block 446 determines operational bounds. Illustrated processing block 448 determines a goal of the mission. Illustrated processing block 450 generates a plan based on information provided in the above identified processing blocks.

Figure 9:
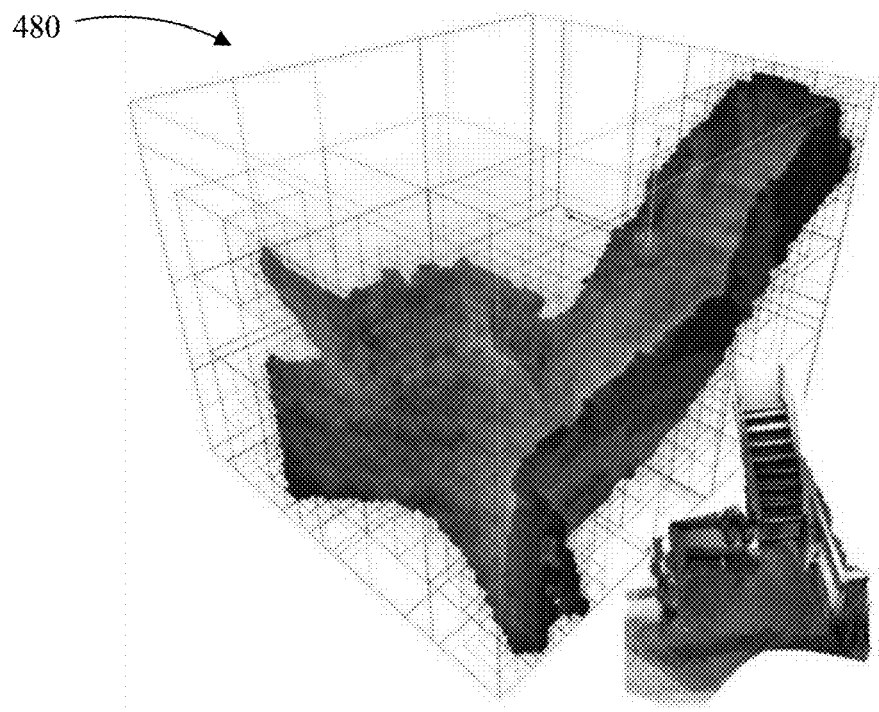
FIG. 9 is a diagram of an example of an octree according to an embodiment.

FIG. 9 illustrates an octree 480 as a spatial map separating the occupied from the empty space based on a multi scan point-cloud. As illustrated the octree 480 represents a staircase. The octree 480 may be an occupied space map.

Figure 10:
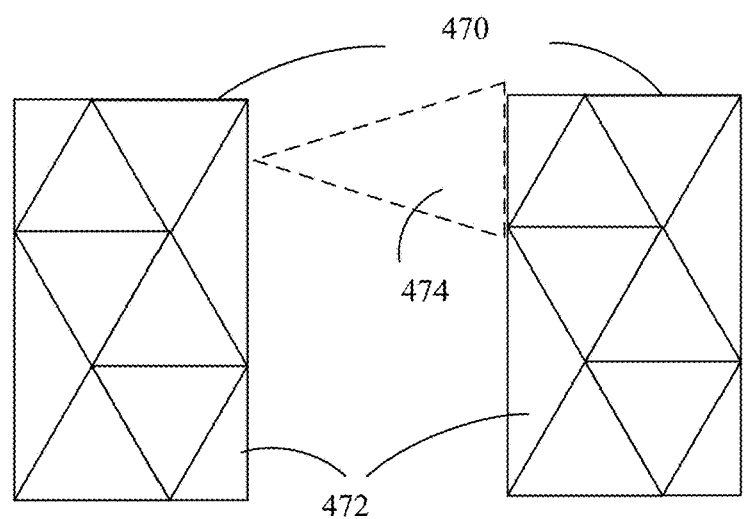
FIG. 10 is a diagram of an example of a structured point-cloud according to an embodiment.

FIG. 10 illustrates a structured point-cloud with vertices and edges. As illustrated, surfaces 470 may be tessellated with primitives that are triangles 472. Valid triangles 472 are illustrated with first characteristics (e.g., unbroken lines). In contrast, a triangle 474 may be considered an invalid primitive (based on criteria as described herein) and illustrated in dashed lines. The invalid triangle 474 may be discarded for future processing.

Figure 11:
FIG. 11 is a diagram of an example of a semantic segmented and labeled image according to an embodiment.
Figure 11:

FIG. 11 illustrates a semantic segmented and labeled image 498. As illustrated, a first object may be labeled as phone 486 while the remaining objects may be labeled as cubes 482, 484, 496. The labels may be generated as described herein. The labels may be stored in tuples for each object.

Figure 12:
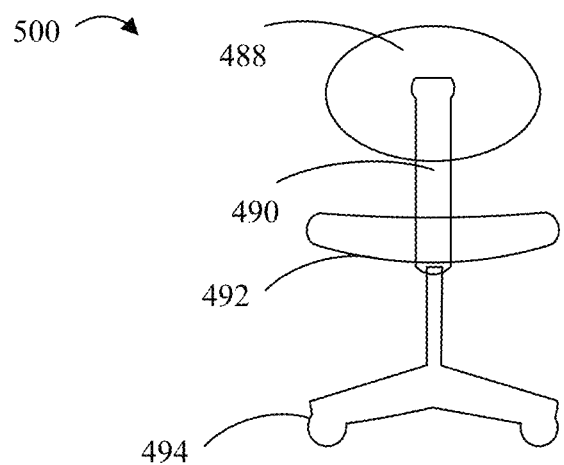
FIG. 12 is a diagram of an example of a part-wise semantic segmentation image according to an embodiment.

FIG. 12 illustrates a part-wise semantic segmentation image 500 of a chair. The various parts of the chair may be labeled. For example, the backrest 488, arm 490, seat 492 and base 494 may be identified and labeled. The labels may be stored in tuples for the chair.

Figure 13:
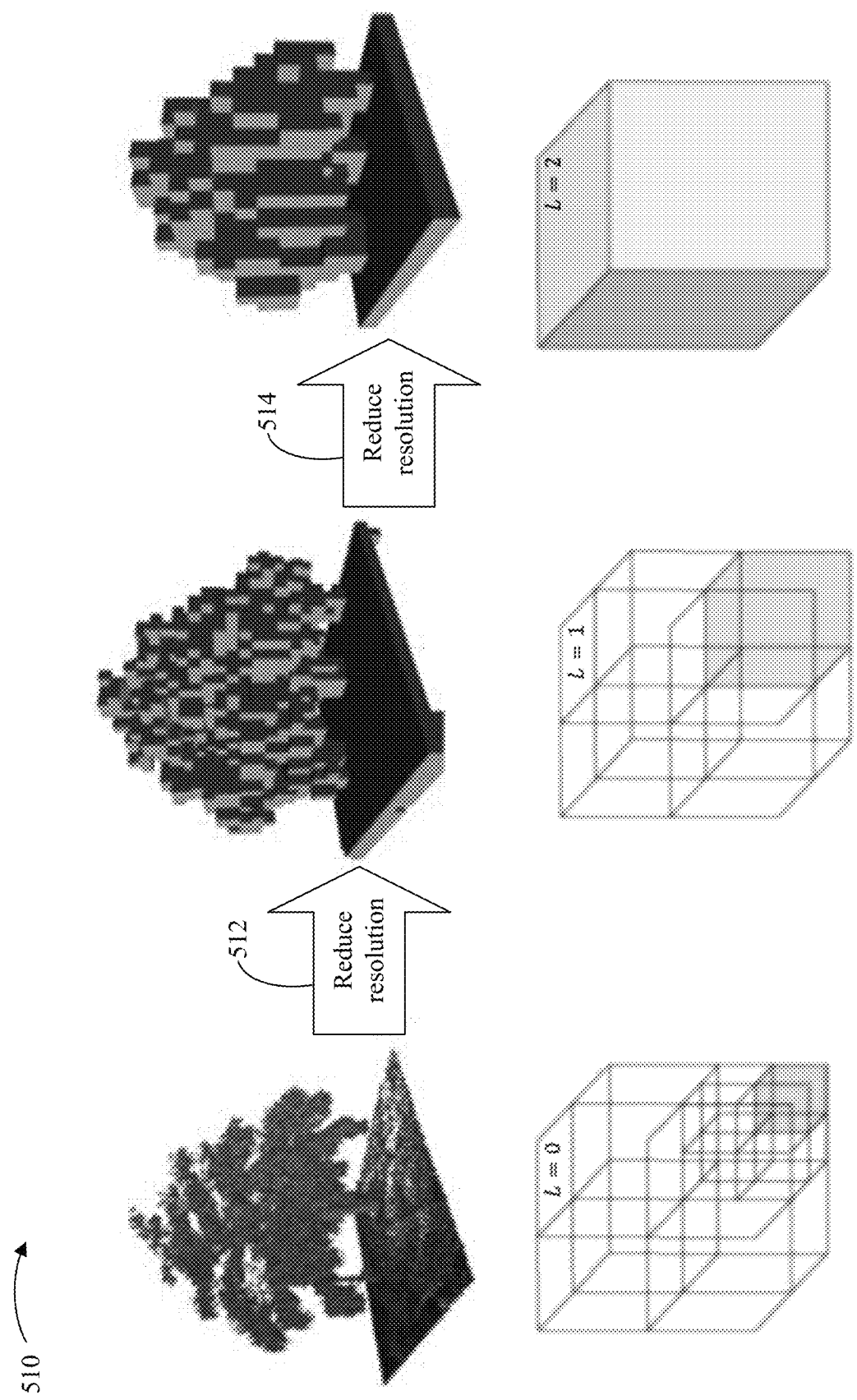
FIG. 13 is a process flow diagram of an example of surface and occupancy subsampling process according to an embodiment.

FIG. 13 illustrates a surface and occupancy subsampling process 510 to reduce resolution of a high quality image and generate PGCs. The process 510 may reduce the resolution 512, 514 to decay the level of detail exponentially (e.g., decimated) allowing efficient summarization while retaining collision cues.

Figure 14:
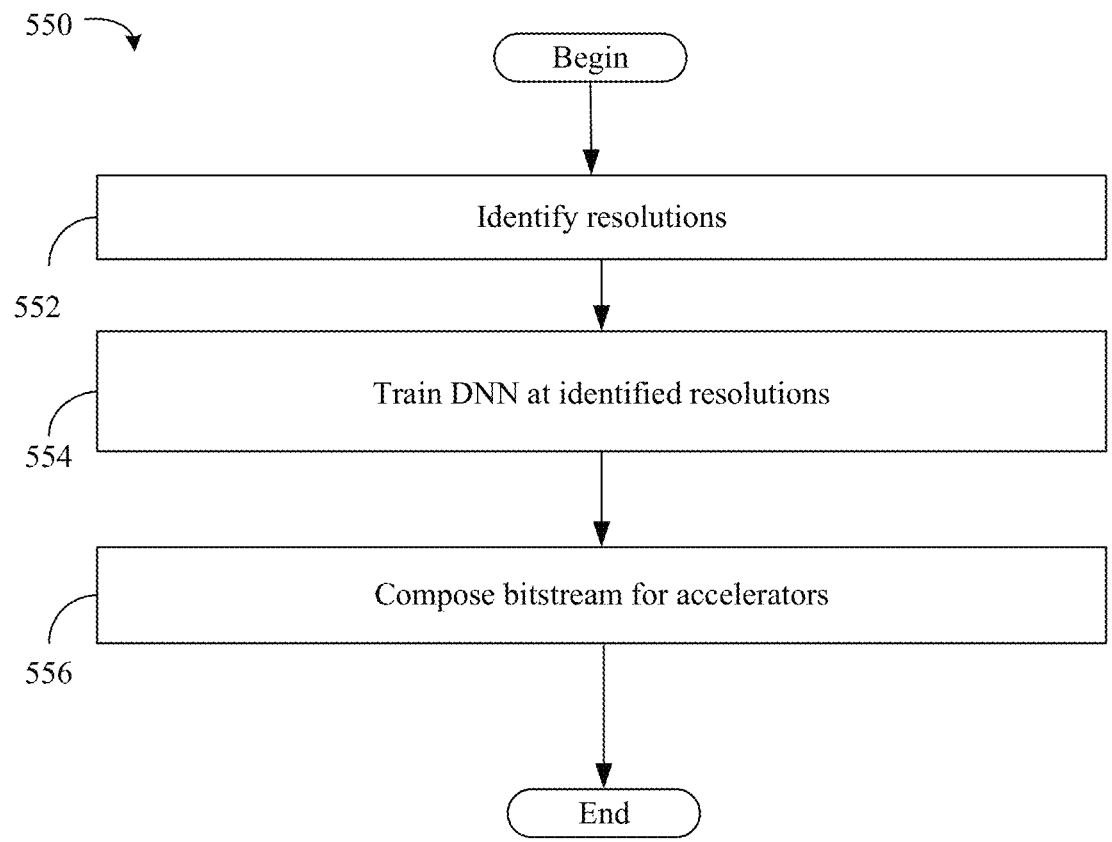
FIG. 14 is a flowchart of an example of a method of training a neural network according to an embodiment.

FIG. 14 illustrates a training method 550 to train a DNN for any of the embodiments described herein. The method 550 may generally be implemented in a robotic process such as, for example, the process 100 (FIG. 1), the method 800 (FIG. 2), the process 300 (FIGS. 3A-3B), the process 350 (FIG. 4), the process 380 (FIG. 5), the method 400 (FIG. 6), the method 420 (FIG. 7), the method 440 (FIG. 8) already discussed. The method 440 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 552 identifies resolutions (e.g., five) to train the DNNs. Illustrated processing block 554 may train the DNNs at the identified resolutions.

In order to train each of these networks via supervised corrective learning (e.g., stochastic gradient descent), the exploitation of simulation engines may enable the recreation of sensor signals comparable (up to noise effects) to those from the real sensors. Using these virtual signals from 3D scenarios (e.g., watertight models with semantic and functional knowledge), the execution of a sensing pipeline may extract the view dependent geometric primitives while semantics and part labels are obtained directly from the models. This allows efficient production of quasi-realistic annotated perception datasets.

Further, exploiting discrete closed-form (DCF) methods for model-based grasping sampled at fine granularity, it may be possible to obtain large collections of valid grasp configuration that may lack only the semantic understanding. Consequently, the process associating semantic-parts (as PGC) with DCF-grasp configurations having enough (with respect to dynamic stability) contact points in a single labeled part may define a mini-batch during training. Further, by growing this associations via language-based affordance in from of vectors arising in language embedding, it may then be possible to formulate the training of each of the neural networks at their native resolutions with all geometric, semantic part, affordance cues. The cost function employed as optimization target during training may be expressed as:

$$\Psi = \sum_O \overbrace{\sum_{T_L} \overbrace{\sum_{\omega_r^s} \underbrace{\left(1 - \prod_{i \in Grasp-set} \lambda_{grasp-ability}(T_i)\right)^2}_{EpanechnikovGrasp-abilityWeighting} \cdot \underbrace{\mho_{Grasp-set}(T_i, T_j)}_{Alignment-cost}}^{\text{For All Perceptual Grasping Components}}}^{\text{For all objects in the training set}}, \quad \text{Equation 20}$$

In equation 20, "O" stands for an object in the training set and the alignment cost function $\mho_{Grasp-set} \mapsto \mathbb{R}^+$ maps the delta in rotation, translation and joint configuration between the grasp $T_i$ and $T_j$ with minimal distance from the training generated grasping set. The graspability may act as a weighting factor for this distance in such a way that the error with lower support imply larger cost for the network optimizer.

Finally, once the networks are trained, illustrated processing block 556 may compose the weights and kernel values into a bitstream for the programmable accelerators.

Figure 15:
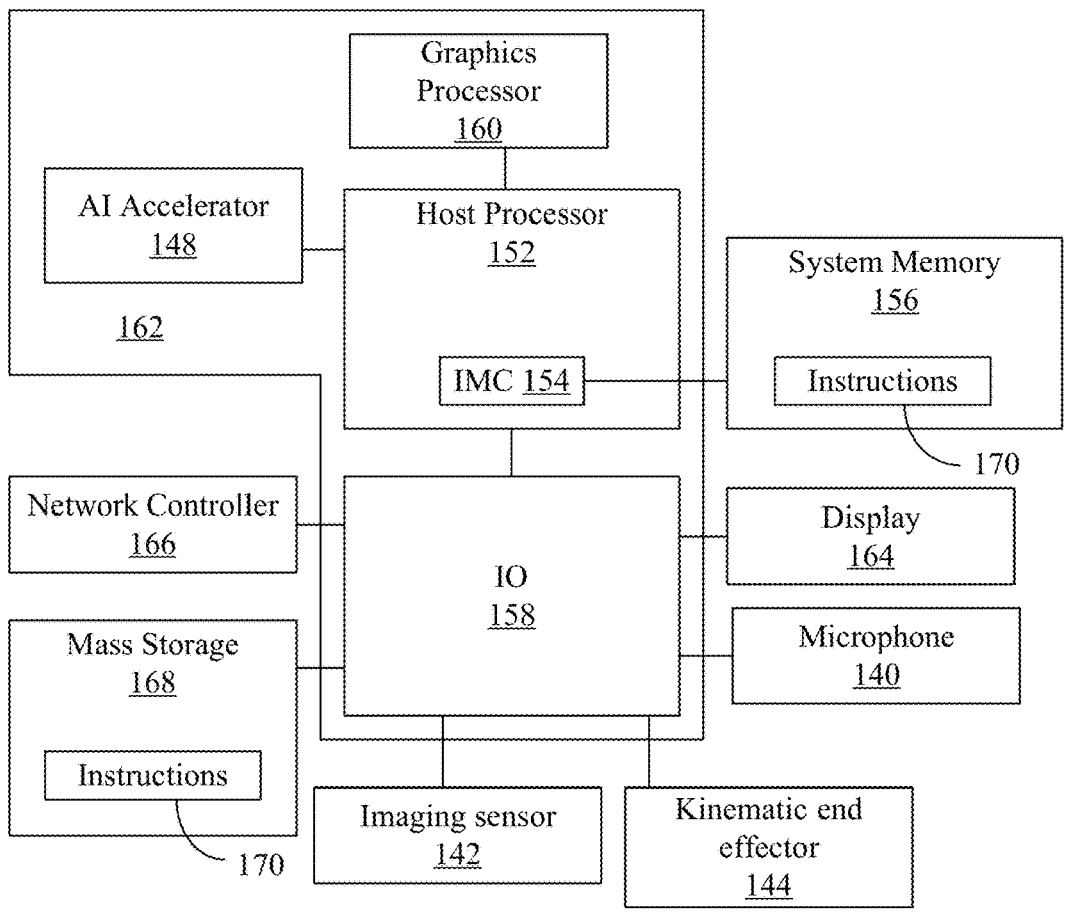
FIG. 15 is a block diagram of an example of a performance-enhanced computing system according to an embodiment.

Turning now to FIG. 15, an enhanced object manipulation planning computing system 150 is shown. The system 150 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 150 includes a host processor 152 (e.g., CPU) having an integrated memory controller (IMC) 154 that is coupled to a system memory 156.

The illustrated system 150 also includes an input output (IO) module 158 implemented together with the host processor 152 and a graphics processor 160 (e.g., GPU) on a semiconductor die 162 as a system on chip (SoC). The illustrated IO module 158 communicates with, for example, a display 164 (e.g., touch screen, liquid crystal display/LCD, light emitting diode/LED display), a network controller 166 (e.g., wired and/or wireless), and mass storage 168 (e.g., hard disk drive/HDD, optical disk, solid state drive/SSD, flash memory). In some embodiments, the system 150 may further include processors and/or AI accelerators 148 dedicated to artificial intelligence (AI) and/or neural network (NN) processing. For example, the system SoC 162 may include vision processing units (VPUs) and/or other AI/NN-specific processors such as AI accelerator 148, etc. In some embodiments, any aspect of the embodiments described herein may be implemented in one or more of the processors and/or accelerators such as AI accelerator 148 dedicated to AI and/or NN processing, the graphics processor 160 and/or the host processor 152.

The host processor 152, the graphics processor 160 and/or the IO module 158 may execute instructions 170 retrieved from the system memory 156 and/or the mass storage 168. In an embodiment, the computing system 150 is operated in an application development stage and the instructions 170 include executable program instructions to perform one or more aspects of the process 100 (FIG. 1), the method 800 (FIG. 2), the process 300 (FIGS. 3A-3B), the process 350 (FIG. 4), the process 380 (FIG. 5), the method 400 (FIG. 6), the method 420 (FIG. 7) and the method 440 (FIG. 8) already discussed. Thus, execution of the illustrated instructions 170 may cause the computing system 150 to generate a semantic labelled image based on image data from the sensor data, where the semantic labelled image is to identify a shape of an object and a semantic label of the object, associate a first set of actions with the object, decompose a command from a user into a second set of actions associated with the object, and generate a plan based on an intersection of the first set of actions and the second set of actions to satisfy the command through actuation of one or more end effectors. The kinematic end effector 144 may implement the plan to manipulate an object.

The system 150 may further include an imaging sensor 142 and microphone 140 to receive sensor data. For example, a user may issue a verbal command to the system 150 through the microphone 140. In some embodiments, the network controller 166 may register a command issued from another device coupled and remote to the system 150. The imaging sensor 142 may capture images that are analyzed to determine the image data.

The illustrated computing system 150 is therefore considered to be performance-enhanced at least to the extent that it enables the computing system 150 to take advantage of environmental data to generate an effective plan to manipulate the kinematic end effector 144 to manipulate the object. The object may be previously unseen by the system 150 and the system 150 may be execute in a dynamic and changing environment.

Figure 16:
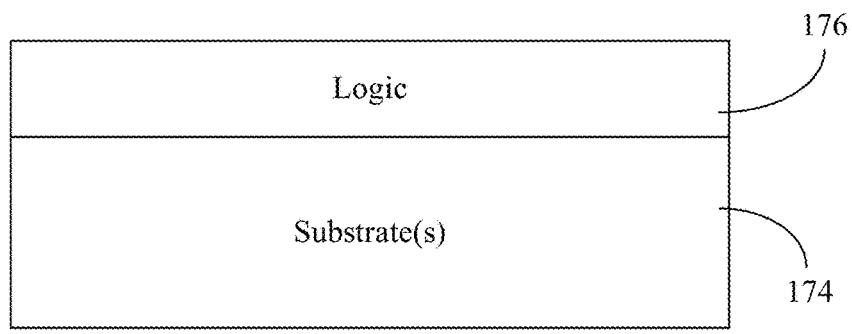
FIG. 16 is an illustration of an example of a semiconductor apparatus according to an embodiment.

FIG. 16 shows a semiconductor apparatus 172 (e.g., chip, die, package). The illustrated apparatus 172 includes one or more substrates 174 (e.g., silicon, sapphire, gallium arsenide) and logic 176 (e.g., transistor array and other integrated circuit/IC components) coupled to the substrate(s) 174. In an embodiment, the apparatus 172 is operated in an application development stage and the logic 176 performs one or more aspects of the process 100 (FIG. 1), the method 800 (FIG. 2), the process 300 (FIGS. 3A-3B, the process 350 (FIG. 4), the process 380 (FIG. 5), the method 400 (FIG. 6), the method 420 (FIG. 7) and the method 440 (FIG. 8) already discussed. Thus, the logic 176 may generate a semantic labelled image based on image data from the sensor data, where the semantic labelled image is to identify a shape of an object and a semantic label of the object, associate a first set of actions with the object, decompose a command from a user into a second set of actions associated with the object, and generate a plan based on an intersection of the first set of actions and the second set of actions to satisfy the command through actuation of one or more end effectors. Thus, the logic 176 may allow for dynamic adjustments of kinematic end effectors to grasp objects based on the environment.

The logic 176 may be implemented at least partly in configurable logic or fixed-functionality hardware logic. In one example, the logic 176 includes transistor channel regions that are positioned (e.g., embedded) within the substrate(s) 174. Thus, the interface between the logic 176 and the substrate(s) 174 may not be an abrupt junction. The logic 176 may also be considered to include an epitaxial layer that is grown on an initial wafer of the substrate(s) 174.

In some embodiments, the logic 176 may further include processors (not shown) and/or accelerators (not shown) dedicated to AI and/or NN processing. For example, the logic 176 may include VPUs, and/or other AI/NN-specific processors, etc. In some embodiments, any aspect of the embodiments described herein may be implemented in the processors and/or accelerators dedicated to AI and/or NN processing.

Figure 17:
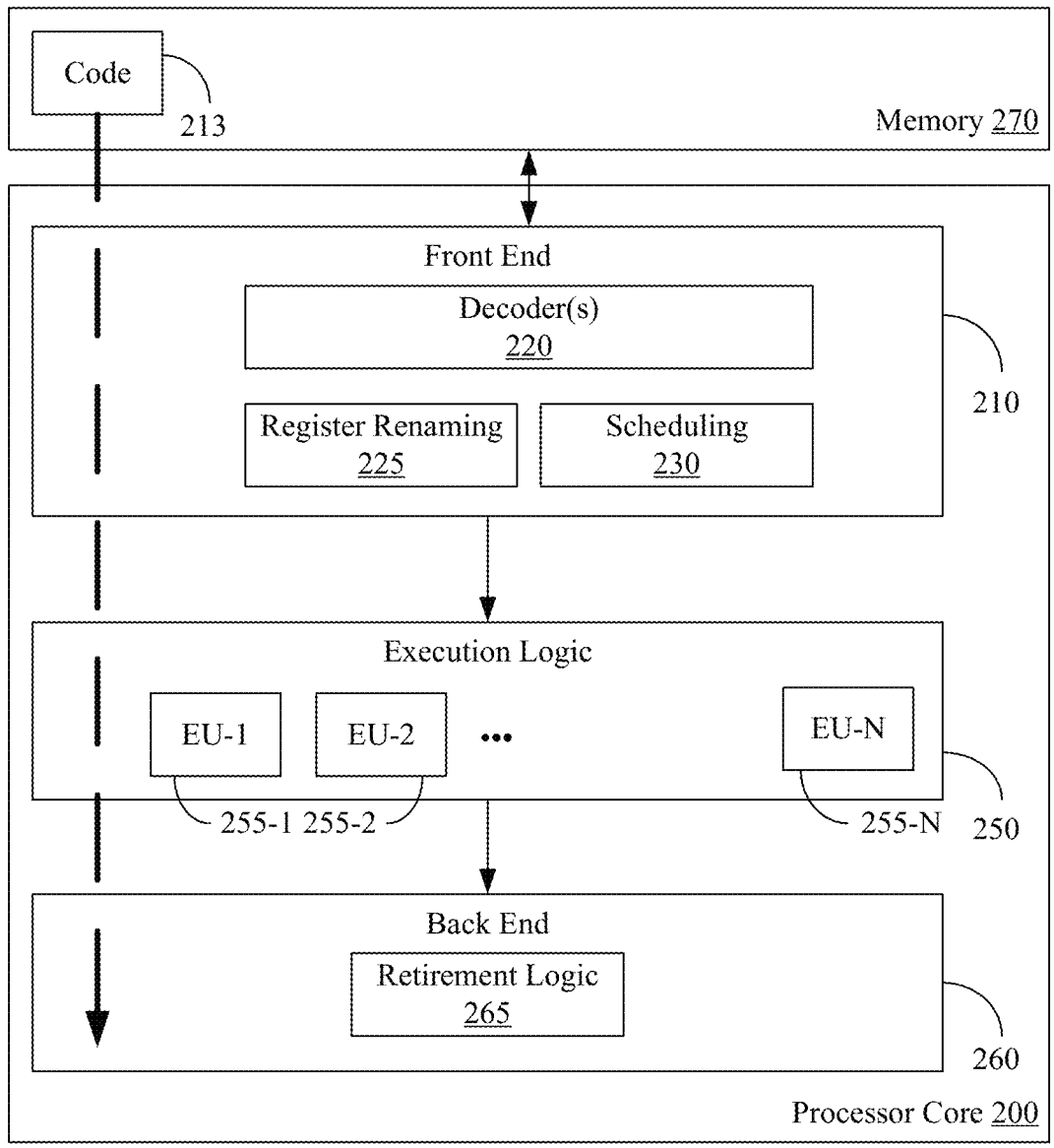
FIG. 17 is a block diagram of an example of a processor according to an embodiment.

FIG. 17 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 17, a processing element may alternatively include more than one of the processor core 200 illustrated in FIG. 17. The processor core 200 may be a single-threaded core or, for at least one embodiment, the processor core 200 may be multithreaded in that it may include more than one hardware thread context (or "logical processor") per core.

FIG. 17 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the process 100 (FIG. 1), the method 800 (FIG. 2), the process 300 (FIGS. 3A-3B, the process 350 (FIG. 4), the process 380 (FIG. 5), the method 400 (FIG. 6), the method 420 (FIG. 7) and the method 440 (FIG. 8) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 17, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 18:
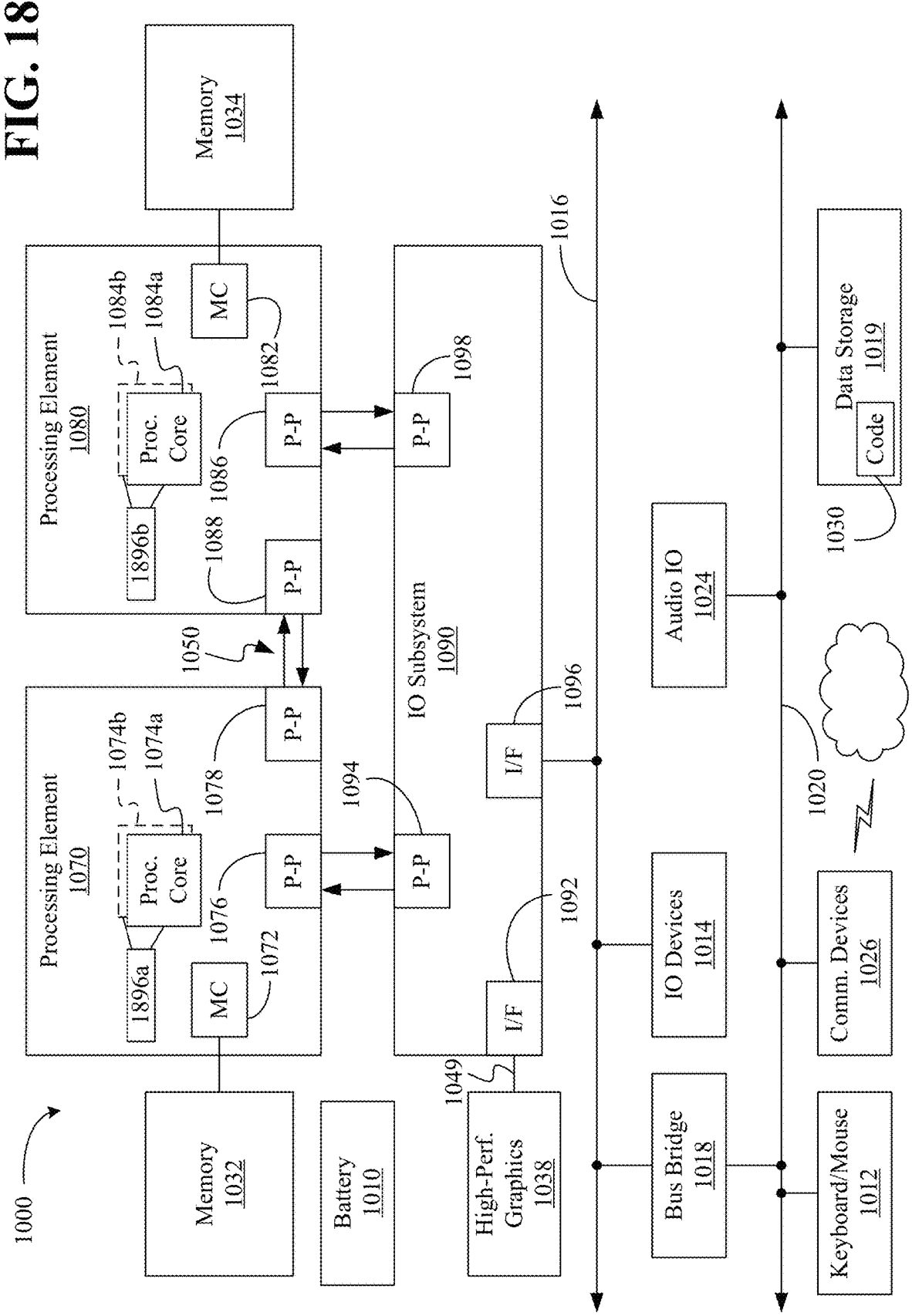
FIG. 18 is a block diagram of an example of a multi-processor based computing system according to an embodiment.

Referring now to FIG. 18, shown is a block diagram of a computing system 1000 embodiment in accordance with an embodiment. Shown in FIG. 18 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 18 may be implemented as a multi-drop bus rather than point-to-point interconnect.

As shown in FIG. 18, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 17.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 18, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 18, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 18, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of process 100 (FIG. 1), the method 800 (FIG. 2), the process 300 (FIGS. 3A-3B, the process 350 (FIG. 4), the process 380 (FIG. 5), the method 400 (FIG. 6), the method 420 (FIG. 7), the method 440 (FIG. 8) already discussed, and may be similar to the code 213 (FIG. 17), already discussed. Further, an audio I/O 1024 may be coupled to second bus 1020 and a battery 1010 may supply power to the computing system 1000.

Note that other embodiments are contemplated. For example, instead of the point-to-point architecture of FIG. 18, a system may implement a multi-drop bus or another such communication topology. Also, the elements of FIG. 18 may alternatively be partitioned using more or fewer integrated chips than shown in FIG. 18.

ADDITIONAL NOTES AND EXAMPLES

Example 1 includes a computing system comprising one or more sensors to generate sensor data, the sensor data to include image data, a processor coupled to the one or more sensors, and a memory including a set of executable program instructions, which when executed by the processor, cause the computing system to generate a semantic labelled image based on image data from the sensor data, wherein the semantic labelled image is to identify a shape of an object and a semantic label of the object, associate a first set of actions with the object and generate a plan based on an intersection of the first set of actions and a second set of actions to satisfy a command from a user through actuation of one or more end effectors, wherein the second set of actions are to be associated with the command.

Example 2 includes the computing system of Example 1, wherein the instructions, when executed, further cause the computing system to apply a first label to a first portion of the object, and apply a second label to a second portion of the object, wherein the second label is to be different from the first label.

Example 3 includes the computing system of Example 1, wherein the instructions, when executed, further cause the computing system to generate a surface patch from the semantic labelled image that is to represent the object, decrease a resolution of the surface patch, and generate the plan based on the surface patch having the decreased resolution.

Example 4 includes the computing system of Example 1, wherein the instructions, when executed, further cause the computing system to identify a contact force map that is to represent contact force outputs mapped to portions of the one or more end effectors, and generate the plan based on the contact force map.

Example 5 includes the computing system of any one of Examples 1-4, wherein the instructions, when executed, further cause the computing system to generate an occupancy map based on the image data, wherein the occupancy map is to identify portions of the image that are to be occupied, and generate a surface map based on the occupancy map that is to identify surfaces of objects.

Example 6 includes the computing system of Example 5, wherein the instructions, when executed, further cause the computing system to connect the surfaces in the surface map to labels to generate the semantic labelled image, and identify the first set of actions based on the labels, wherein the first set of actions is to include a first action to physically manipulate the object, wherein the second set of actions is to include the first action to physically manipulate the object; and wherein the plan is to include a physical manipulation of the object with the first action.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to generate a semantic labelled image based on image data, wherein the semantic labelled image is to identify a shape of an object and a semantic label of the object, associate a first set of actions with the object, and generate a plan based on an intersection of the first set of actions and a second set of actions to satisfy a command from a user through actuation of one or more end effectors, wherein the second set of actions are to be associated with the command.

Example 8 includes the apparatus of Example 7, wherein the logic coupled to the one or more substrates is to apply a first label to a first portion of the object, and apply a second label to a second portion of the object, wherein the second label is to be different from the first label.

Example 9 includes the apparatus of Example 7, wherein the logic coupled to the one or more substrates is to generate a surface patch from the semantic labelled image that is to represent the object, decrease a resolution of the surface patch, and generate the plan based on the surface patch having the decreased resolution.

Example 10 includes the apparatus of Example 7, wherein the logic coupled to the one or more substrates is to identify a contact force map that is to represent contact force outputs mapped to portions of the one or more end effectors, and generate the plan based on the contact force map.

Example 11 includes the apparatus of any one of Examples 7-10, wherein the logic coupled to the one or more substrates is to generate an occupancy map based on the image data, wherein the occupancy map is to identify portions of the image that are to be occupied, and generate a surface map based on the occupancy map that is to identify surfaces of objects.

Example 12 includes the apparatus of Example 11, wherein the logic coupled to the one or more substrates is to connect the surfaces in the surface map to labels to generate the semantic labelled image, and identify the first set of actions based on the labels, wherein the first set of actions is to include a first action to physically manipulate the object, wherein the second set of actions is to include the first action to physically manipulate the object, and wherein the plan is to include a physical manipulation of the object with the first action.

Example 13 includes the apparatus of Example 7, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to generate a semantic labelled image based on image data, wherein the semantic labelled image is to identify a shape of an object and a semantic label of the object, associate a first set of actions with the object, and generate a plan based on an intersection of the first set of actions and a second set of actions to satisfy a command from a user through actuation of one or more end effectors, wherein the second set of actions are to be associated with the command.

Example 15 includes the at least one computer readable storage medium of Example 14, wherein the instructions, when executed, further cause the computing system to apply a first label to a first portion of the object, and apply a second label to a second portion of the object, wherein the second label is to be different from the first label.

Example 16 includes the at least one computer readable storage medium of Example 14, wherein the instructions, when executed, further cause the computing system to generate a surface patch from the semantic labelled image that is to represent the object, decrease a resolution of the surface patch, and generate the plan based on the surface patch having the decreased resolution.

Example 17 includes the at least one computer readable storage medium of Example 14, wherein the instructions, when executed, further cause the computing system to identify a contact force map that is to represent contact force outputs mapped to portions of the one or more end effectors, and generate the plan based on the contact force map.

Example 18 includes the at least one computer readable storage medium of any one of Examples 14-17, wherein the instructions, when executed, further cause the computing system to generate an occupancy map based on the image data, wherein the occupancy map is to identify portions of the image that are to be occupied, and generate a surface map based on the occupancy map that is to identify surfaces of objects.

Example 19 includes the at least one computer readable storage medium of Example 18, wherein the instructions, when executed, further cause the computing system to connect the surfaces in the surface map to labels to generate the semantic labelled image, and identify the first set of actions based on the labels, wherein the first set of actions is to include a first action to physically manipulate the object, wherein the second set of actions is to include the first action to physically manipulate the object, and wherein the plan is to include a physical manipulation of the object with the first action.

Example 20 includes a method of operating a computing system, the method comprising generating a semantic labelled image based on image data, wherein the semantic labelled image is to identify a shape of an object and a semantic label of the object, associating a first set of actions with the object, and generating a plan based on an intersection of the first set of actions and a second set of actions to satisfy a command from a user through actuation of one or more end effectors, wherein the second set of actions are to be associated with the command.

Example 21 includes the method of Example 20, further comprising applying a first label to a first portion of the object, and applying a second label to a second portion of the object, wherein the second label is to be different from the first label.

Example 22 includes the method of Example 20, further comprising generating a surface patch from the semantic labelled image that is to represent the object, decreasing a resolution of the surface patch, and generating the plan based on the surface patch having the decreased resolution.

Example 23 includes the method of Example 20, further comprising identifying a contact force map that represents contact force outputs mapped to portions of the one or more end effectors, and generating the plan based on the contact force map.

Example 24 includes the method of any one of Examples 20-23, further comprising generating an occupancy map based on the image data, wherein the occupancy map is to identify portions of the image that are to be occupied, and generating a surface map based on the occupancy map that is to identify surfaces of objects.

Example 25 includes the method of Example 24, further comprising connecting the surfaces in the surface map to labels to generate the semantic labelled image, and identifying the first set of actions based on the labels, wherein the first set of actions is to include a first action to physically manipulate the object, wherein the second set of actions is to include the first action to physically manipulate the object, and wherein the plan is to include a physical manipulation of the object with the first action.

Example 26 includes a semiconductor apparatus comprising means for generating a semantic labelled image based on image data, wherein the semantic labelled image is to identify a shape of an object and a semantic label of the object, means for associating a first set of actions with the object, and means for generating a plan based on an intersection of the first set of actions and a second set of actions to satisfy a command from a user through actuation of one or more end effectors, wherein the second set of actions are to be associated with the command.

Example 27 includes the apparatus of Example 26, further comprising means for applying a first label to a first portion of the object, and means for applying a second label to a second portion of the object, wherein the second label is to be different from the first label.

Example 28 includes the apparatus of Example 26, further comprising means for generating a surface patch from the semantic labelled image that is to represent the object, means for decreasing a resolution of the surface patch, and means for generating the plan based on the surface patch having the decreased resolution.

Example 29 includes the apparatus of Example 26, further comprising means for identifying a contact force map that represents contact force outputs mapped to portions of the one or more end effectors, and means for generating the plan based on the contact force map.

Example 30 includes the apparatus of any one of Examples 26-29, further comprising means for generating an occupancy map based on the image data, wherein the occupancy map is to identify portions of the image that are to be occupied, and means for generating a surface map based on the occupancy map that is to identify surfaces of objects.

Example 31 includes the apparatus of Example 26, further comprising means for connecting the surfaces in the surface map to labels to generate the semantic labelled image, and means for identifying the first set of actions based on the labels, wherein the first set of actions is to include a first action to physically manipulate the object, wherein the second set of actions is to include the first action to physically manipulate the object, and wherein the plan is to include a physical manipulation of the object with the first action Thus, technology described herein may provide for an autonomous robot that dynamically adjusts kinematic end effectors to manipulate (e.g., grip) objects in quickly changing environments. The autonomous robot may also reduce memory footprints and latency with resolution reduced semantic patches and early vetting of and rejection of unsuitable grasps and semantic patches.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method of operating a computing system, the method comprising:
   generating a semantic labelled image based on image data, wherein the semantic labelled image is to identify a shape of an object and a semantic label of the object;
   associating a first set of actions with the object based on the semantic labelled image, wherein the first set of actions are possible physical manipulations of the object;
   determining a second set of actions that are executable with one or more end effectors; and
   generating a plan based on a subset of actions that comprises an intersection of the first set of actions and the second set of actions to satisfy a command from a user through actuation of the one or more end effectors, wherein the second set of actions are to be associated with the command.

2. The method of claim 1, further comprising:
   applying a first label to a first portion of the object; and
   applying a second label to a second portion of the object, wherein the second label is to be different from the first label.

3. The method of claim 1, further comprising:
   generating a surface patch from the semantic labelled image that is to represent the object;
   decreasing a resolution of the surface patch; and
   generating the plan based on the surface patch having the decreased resolution.

4. The method of claim 1, further comprising:
   identifying a contact force map that represents contact force outputs mapped to portions of the one or more end effectors; and
   generating the plan based on the contact force map.

5. The method of claim 1, further comprising:
generating an occupancy map based on the image data, wherein the occupancy map is to identify portions of an environment that are to be occupied; and
generating a surface map based on the occupancy map that is to identify surfaces of objects.

6. The method of claim 5, further comprising:
connecting the surfaces in the surface map to labels to generate the semantic labelled image; and
identifying the first set of actions based on the labels;
wherein the first set of actions is to include a first action to physically manipulate the object;
wherein the second set of actions is to include the first action to physically manipulate the object; and
wherein the plan is to include a physical manipulation of the object with the first action.

7. At least one non-transitory computer readable storage medium comprising a set of executable program instructions, which when executed by a computing system, cause the computing system to:
generate a semantic labelled image based on image data, wherein the semantic labelled image is to identify a shape of an object and a semantic label of the object;
associate a first set of actions with the object based on the semantic labelled image, wherein the first set of actions are possible physical manipulations of the object;
determine a second set of actions that are executable with one or more end effectors; and
generate a plan based on a subset of actions that comprises an intersection of the first set of actions and the second set of actions to satisfy a command from a user through actuation of the one or more end effectors, wherein the second set of actions are to be associated with the command.

8. The at least one non-transitory computer readable storage medium of claim 7, wherein the instructions, when executed, further cause the computing system to:
apply a first label to a first portion of the object; and
apply a second label to a second portion of the object, wherein the second label is to be different from the first label.

9. The at least one non-transitory computer readable storage medium of claim 7, wherein the instructions, when executed, further cause the computing system to:
generate a surface patch from the semantic labelled image that is to represent the object;
decrease a resolution of the surface patch; and
generate the plan based on the surface patch having the decreased resolution.

10. The at least one non-transitory computer readable storage medium of claim 7, wherein the instructions, when executed, further cause the computing system to:
identify a contact force map that is to represent contact force outputs mapped to portions of the one or more end effectors; and
generate the plan based on the contact force map.

11. The at least one non-transitory computer readable storage medium of claim 7, wherein the instructions, when executed, further cause the computing system to:
generate an occupancy map based on the image data, wherein the occupancy map is to identify portions of an environment that are to be occupied; and
generate a surface map based on the occupancy map that is to identify surfaces of objects.

12. The at least one non-transitory computer readable storage medium of claim 11, wherein the instructions, when executed, further cause the computing system to:
connect the surfaces in the surface map to labels to generate the semantic labelled image; and
identify the first set of actions based on the labels;
wherein the first set of actions is to include a first action to physically manipulate the object;
wherein the second set of actions is to include the first action to physically manipulate the object; and
wherein the plan is to include a physical manipulation of the object with the first action.

13. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
generate a semantic labelled image based on image data, wherein the semantic labelled image is to identify a shape of an object and a semantic label of the object;
associate a first set of actions with the object based on the semantic labelled image, wherein the first set of actions are possible physical manipulations of the object;
determine a second set of actions that are executable with one or more end effectors; and
generate a plan based on a subset of actions that comprises an intersection of the first set of actions and the second set of actions to satisfy a command from a user through actuation of the one or more end effectors, wherein the second set of actions are to be associated with the command.

14. The apparatus of claim 13, wherein the logic coupled to the one or more substrates is to:
apply a first label to a first portion of the object; and
apply a second label to a second portion of the object, wherein the second label is to be different from the first label.

15. The apparatus of claim 13, wherein the logic coupled to the one or more substrates is to:
generate a surface patch from the semantic labelled image that is to represent the object;
decrease a resolution of the surface patch; and
generate the plan based on the surface patch having the decreased resolution.

16. The apparatus of claim 13, wherein the logic coupled to the one or more substrates is to:
identify a contact force map that is to represent contact force outputs mapped to portions of the one or more end effectors; and
generate the plan based on the contact force map.

17. The apparatus of claim 13, wherein the logic coupled to the one or more substrates is to:
generate an occupancy map based on the image data, wherein the occupancy map is to identify portions of an environment that are to be occupied; and
generate a surface map based on the occupancy map that is to identify surfaces of objects.

18. The apparatus of claim 17, wherein the logic coupled to the one or more substrates is to:
connect the surfaces in the surface map to labels to generate the semantic labelled image; and
identify the first set of actions based on the labels;
wherein the first set of actions is to include a first action to physically manipulate the object;
wherein the second set of actions is to include the first action to physically manipulate the object; and
wherein the plan is to include a physical manipulation of the object with the first action.

19. The apparatus of claim 13, wherein the logic coupled to the one or more substrates includes transistor channel regions that are positioned within the one or more substrates.

20. A computing system comprising:
one or more sensors to generate sensor data, the sensor data to include image data;
a processor coupled to the one or more sensors; and
a memory including a set of executable program instructions, which when executed by the processor, cause the computing system to:
generate a semantic labelled image based on the image data, wherein the semantic labelled image is to identify a shape of an object and a semantic label of the object;
associate a first set of actions with the object based on the semantic labelled image, wherein the first set of actions are possible physical manipulations of the object;
determine a second set of actions that are executable with one or more end effectors; and
generate a plan based on a subset of actions that comprises an intersection of the first set of actions and the second set of actions to satisfy a command from a user through actuation of the one or more end effectors, wherein the second set of actions are to be associated with the command.

21. The computing system of claim 20, wherein the instructions, when executed, further cause the computing system to:
apply a first label to a first portion of the object; and
apply a second label to a second portion of the object, wherein the second label is to be different from the first label.

22. The computing system of claim 20, wherein the instructions, when executed, further cause the computing system to:
generate a surface patch from the semantic labelled image that is to represent the object;
decrease a resolution of the surface patch; and
generate the plan based on the surface patch having the decreased resolution.

23. The computing system of claim 20, wherein the instructions, when executed, further cause the computing system to:
identify a contact force map that is to represent contact force outputs mapped to portions of the one or more end effectors; and
generate the plan based on the contact force map.

24. The computing system of claim 20, wherein the instructions, when executed, further cause the computing system to:
generate an occupancy map based on the image data, wherein the occupancy map is to identify portions of an environment that are to be occupied; and
generate a surface map based on the occupancy map that is to identify surfaces of objects.

25. The computing system of claim 24, wherein the instructions, when executed, further cause the computing system to:
connect the surfaces in the surface map to labels to generate the semantic labelled image; and
identify the first set of actions based on the labels;
wherein the first set of actions is to include a first action to physically manipulate the object;
wherein the second set of actions is to include the first action to physically manipulate the object; and
wherein the plan is to include a physical manipulation of the object with the first action.

* * * * *